(12) United States Patent
Guo

(10) Patent No.: US 8,463,029 B2
(45) Date of Patent: Jun. 11, 2013

(54) FACE AND HEAD DETECTION

(75) Inventor: Muling Guo, Kawasaki (JP)

(73) Assignee: Canon Kbaushiki Kaisha, Tokyo (JP)

( * ) Notice: Subject to any disclaimer, the term of this patent is extended or adjusted under 35 U.S.C. 154(b) by 257 days.

(21) Appl. No.: 12/976,371

(22) Filed: Dec. 22, 2010

(65) Prior Publication Data

US 2011/0164816 A1 Jul. 7, 2011

(30) Foreign Application Priority Data

Jan. 5, 2010 (JP) .................................. 2010-000793

(51) Int. Cl.
*G06K 9/00* (2006.01)
*G06K 9/48* (2006.01)

(52) U.S. Cl.
USPC .......................................... 382/165; 382/199

(58) Field of Classification Search
None
See application file for complete search history.

(56) References Cited

U.S. PATENT DOCUMENTS

| | | | | |
|---|---|---|---|---|
| 6,148,092 A * | 11/2000 | Qian | .............................. | 382/118 |
| 2002/0090132 A1 * | 7/2002 | Boncyk et al. | ................. | 382/154 |
| 2005/0063582 A1 * | 3/2005 | Park et al. | ....................... | 382/154 |
| 2005/0117779 A1 * | 6/2005 | Horie et al. | ..................... | 382/103 |
| 2005/0180611 A1 * | 8/2005 | Oohashi et al. | ............... | 382/118 |
| 2006/0147108 A1 * | 7/2006 | Kee et al. | ....................... | 382/159 |
| 2006/0187305 A1 * | 8/2006 | Trivedi et al. | .................. | 348/169 |
| 2007/0133879 A1 * | 6/2007 | Fukaya et al. | ................. | 382/190 |
| 2007/0269082 A1 * | 11/2007 | Matsuyama | .................... | 382/118 |
| 2007/0291984 A1 * | 12/2007 | Yang et al. | ..................... | 382/103 |
| 2008/0137957 A1 * | 6/2008 | Xu et al. | ........................ | 382/190 |
| 2008/0240571 A1 * | 10/2008 | Tian et al. | ...................... | 382/190 |
| 2009/0028380 A1 * | 1/2009 | Hillebrand et al. | ............ | 382/100 |

OTHER PUBLICATIONS

M.H. Yang, et al., "Detecting Faces in Images: A Survey", IEEE Trans. on Pattern Analysis and Machine Intelligence, vol. 24, No. 1, pp. 34-58, Jan. 2002.
P. Viola, et al., "Robust Real-time Object Detection", in Proc. of IEEE Workshop on Statistical and Computational Theories of Vision, Jul. 2001.
R. Duda, et al., "Use of the Hough Transformation to Detect Lines and Curves in Pictures", Communications of the Association for Computing Machinery, vol. 15, No. 1, pp. 11-15, Jan. 1972.
S. Birchfield, "Elliptical Head Tracking Using Intensity Gradients and Color Histograms", Proceedings of IEEE International Conference on Computer Vision and Pattern Recognition (CVPR'98), Santa Barbara, California, pp. 232-237, Jun. 1998.

* cited by examiner

*Primary Examiner* — Wenpeng Chen
*Assistant Examiner* — Feng Niu
(74) *Attorney, Agent, or Firm* — Fitzpatrick, Cella, Harper & Scinto

(57) ABSTRACT

An image processing apparatus includes a face detection unit configured to detect a face area of a person from an image, and a head detection area setting unit configured to set a head detection area based on the detected face area of the person. An edge detection unit is configured to detect an edge from the set head detection area, and to generate an edge image which is comprised of the detected edge. An edge deletion unit is configured to delete an edge existing between the face and hair from the edge image, and an ellipse detection unit is configured to detect a candidate ellipse corresponding to a head area from an edge image from which an edge is deleted by the edge deletion unit.

14 Claims, 22 Drawing Sheets

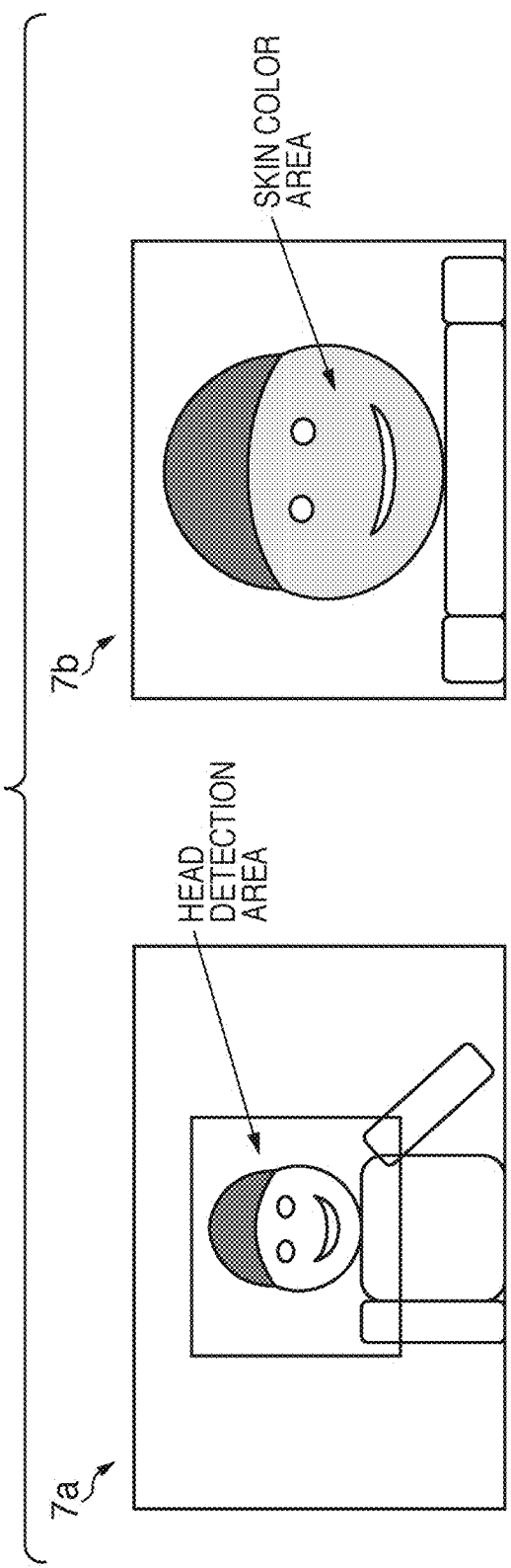

| 1 1 1 1 1 1 1 1 | 0 0 1 1 1 1 1 0 0 |
| 1 1 1 1 1 1 1 1 | 0 1 1 1 1 1 1 1 0 |
| 1 1 1 1 1 1 1 1 | 1 1 1 1 1 1 1 1 1 |
| 1 1 1 1 1 1 1 1 | 1 1 1 1 1 1 1 1 1 |
| 1 1 1 1 1 1 1 1 | 1 1 1 1 1 1 1 1 1 |
| 1 1 1 1 1 1 1 1 | 1 1 1 1 1 1 1 1 1 |
| 1 1 1 1 1 1 1 1 | 1 1 1 1 1 1 1 1 1 |
| 1 1 1 1 1 1 1 1 | 0 1 1 1 1 1 1 1 0 |
| 1 1 1 1 1 1 1 1 | 0 0 1 1 1 1 1 0 0 |

8a

8b

FIG. 9A
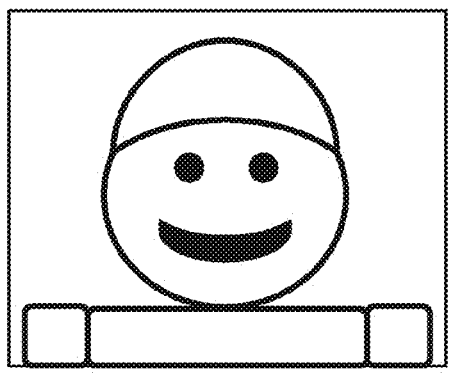 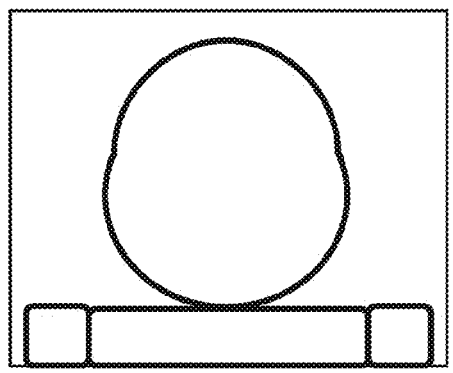
9a-1   9a-2
FIG. 9B
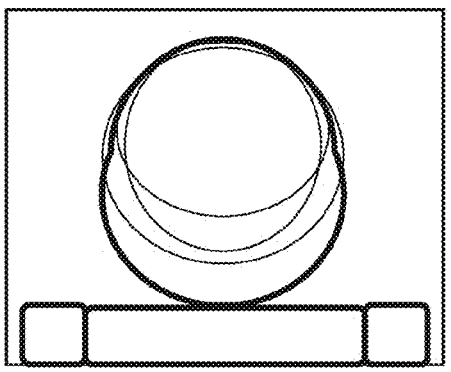 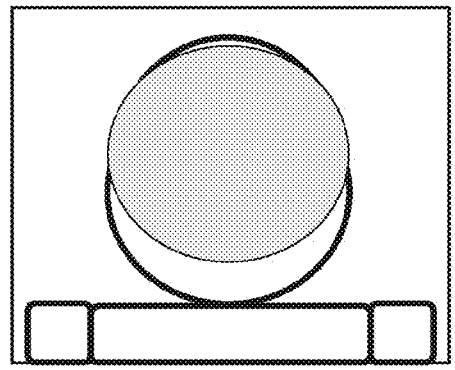
9b-1   9b-2

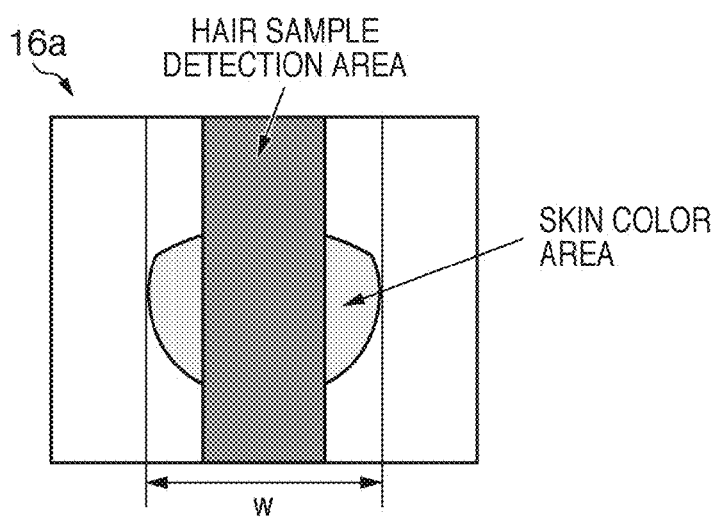
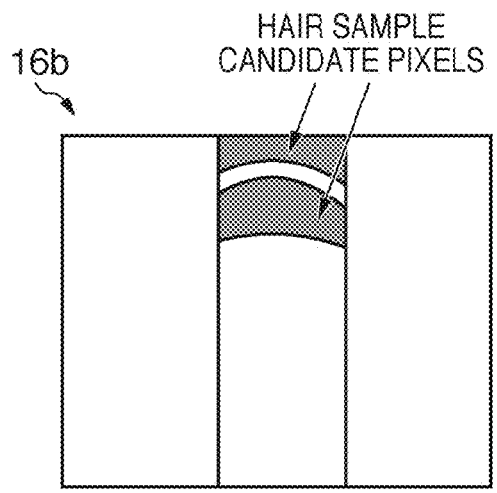
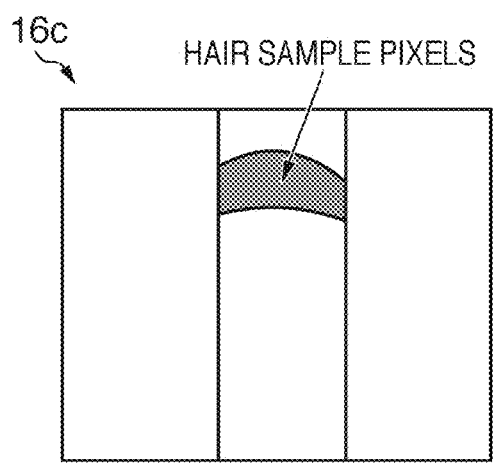
FIG. 16

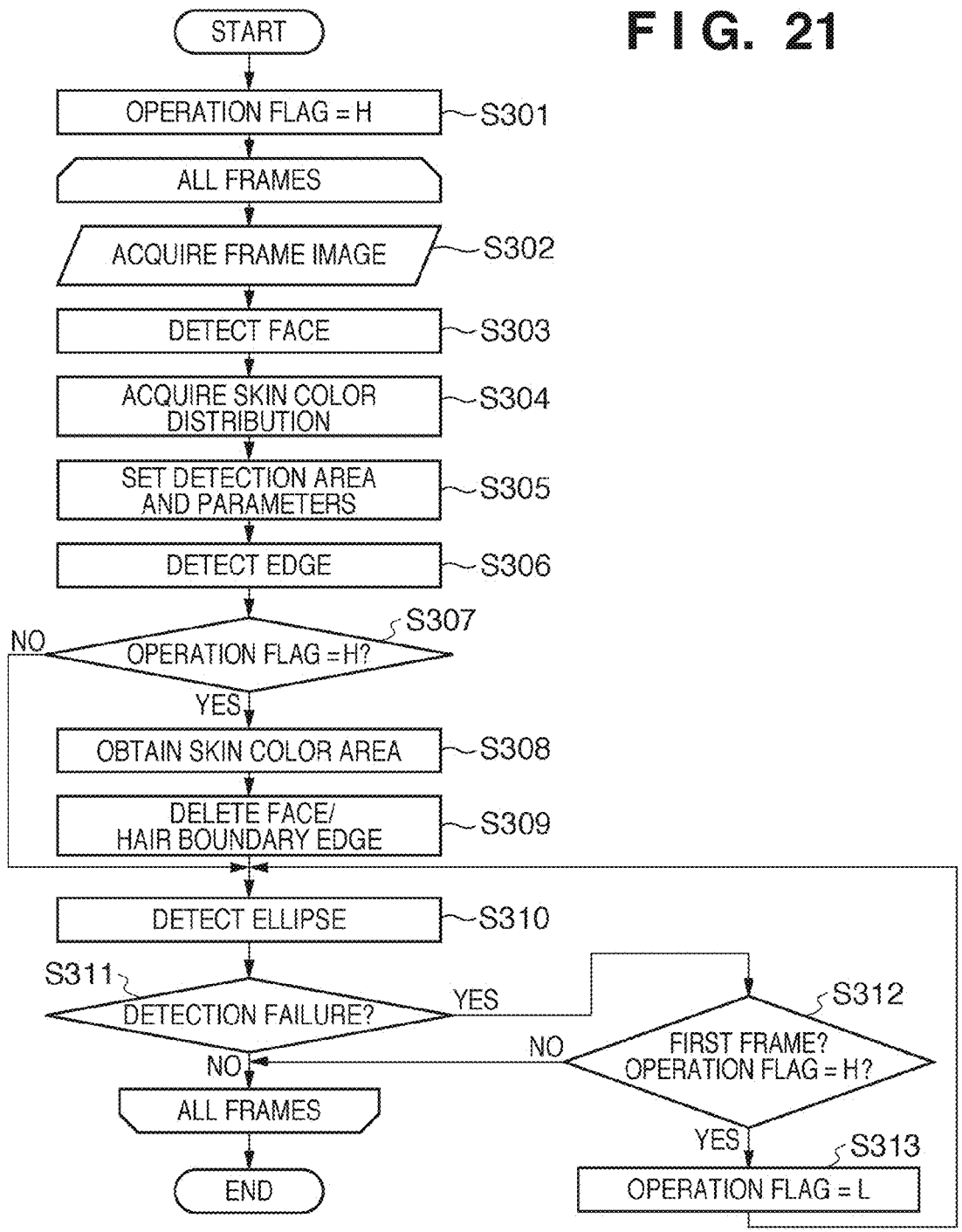

FACE AND HEAD DETECTION

BACKGROUND OF THE INVENTION

1. Field of the Invention

The present invention relates to an apparatus which detects the head area of a person from a picture captured by an image capturing apparatus such as a camera.

2. Description of the Related Art

Recently, attention has been paid to a function of automatically controlling the focus and exposure of a camera or the posture of the camera for panning, tilting, zooming, and the like by specifying and tracking the position of a designated person in the picture captured by an image capturing apparatus such as a camera.

The position of a person has been generally specified by detecting a face pattern of the person and tracking the movement of the pattern. Techniques of detecting a face in such an image include various schemes disclosed in M. H. Yang, D. J. Kriegman, and N. Ahuja, "Detecting Faces in Images: A Survey", IEEE Trans. on PAMI, Vol. 24, No. 1, pp. 34-58, January, 2002. Face detection studies have widely used the AdaBoost based technique disclosed in P. Viola and M. Jones, "Robust Real-time Object Detection", in Proc. of IEEE Workshop SCTV, July, 2001 owing to the high detection execution speed and high detection ratio. However, simply detecting and tracking a face pattern of a person are not sufficient to specify the position of the person. This is because when the person faces sideways or backwards, it may be impossible to detect a face pattern.

To detect and track a head area instead of a face, therefore, is a promising ways for compensating for the drawbacks in face pattern detection. It is possible to use, for the detection of a head area, the detection of curves by using the Hough transformation described in Duda, R. O. and P. E. Hart, "Use of the Hough Transformation to Detect Lines and Curves in Pictures", Comm. ACM, Vol. 15, pp. 11-15 (January, 1972), the ellipse detection method described in Stan Birchfield, "Elliptical Head Tracking Using Intensity Gradients and Color Histograms", Proc. IEEE International Conference On Computer Vision and Pattern Recognition (CVPR '98), Santa Barbara, Calif., pp. 232-237, June 1998, or the like.

In detection of a head ellipse using the Hough transformation or the technique described in Stan Birchfield, "Elliptical Head Tracking Using Intensity Gradients and Color Histograms", Proc. IEEE International Conference On Computer Vision and Pattern Recognition (CVPR '98), Santa Barbara, Calif., pp. 232-237, June 1998, an edge having an intensity similar to that between the head and the background often exists between the face and the hair. For this reason, an edge between the face and the hair is often mistaken for a head edge. If this false detection continues, tracking of a person becomes unstable. For example, when a person faces backwards, an edge between the face and the hair disappears. As a consequence, the person is lost from tracking.

SUMMARY OF THE INVENTION

The present invention has been made in consideration of the above problems, and provides a technique of preventing false detection of an edge within a boundary of the head and accurately detecting a head area.

According to one aspect of the invention, there is provided an image processing apparatus comprising: a face detection unit configured to detect a face area of a person from an image; a head detection area setting unit configured to set a head detection area based on the detected face area of the person; an edge detection unit configured to detect an edge from the set head detection area, and generate an edge image which is comprised of the detected edge; an edge deletion unit configured to delete an edge existing between the face and hair from the edge image; and an ellipse detection unit configured to detect a candidate ellipse corresponding to a head area from an edge image from which an edge is deleted by the edge deletion unit.

According to another aspect of the invention, there is provided an image processing method comprising steps of: detecting a face area of a person from an image; setting a head detection area based on the detected face area of the person; detecting an edge from the set head detection area and generating an edge image which is comprised of the detected edge; deleting an edge existing between the face and hair from the edge image; and detecting a candidate ellipse corresponding to a head area from an edge image from which an edge is deleted in the deleting step.

The arrangement according to the present invention can prevent falsely recognizing a boundary between a face color area and a hair color area as a boundary of the head, and can accurately detect a head area.

Further features of the present invention will become apparent from the following description of exemplary embodiments (with reference to the attached drawings).

BRIEF DESCRIPTION OF THE DRAWINGS

FIG. 7 shows the relationship between a detected head detection area and a detected skin color area;

FIGS. 8A and 8B are views showing skin color area expansion masks in the first and second embodiments;

FIGS. 9A and 9B are views showing examples of an edge image after the deletion of noise edges, candidate head ellipses, and the head ellipse selected from the candidate head ellipses;

FIG. 16 shows examples of a hair sample detection area, hair sample candidate pixels, and extracted hair sample pixels;

FIG. 21 is a flowchart showing a processing procedure in the third embodiment;

DESCRIPTION OF THE EMBODIMENTS

First Embodiment (Arrangement)

The first embodiment of the present invention will be described below with reference to the accompanying drawings.

Figure 1:
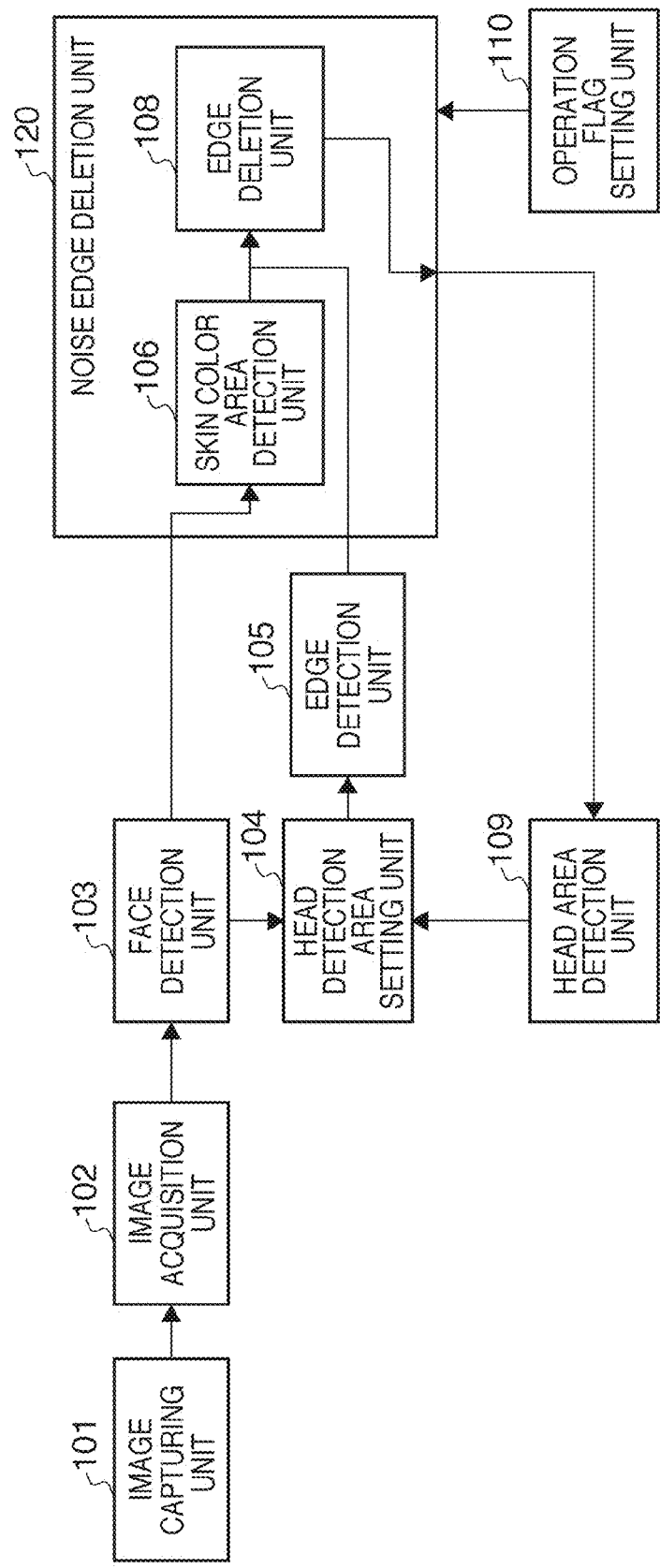
FIG. 1 is a block diagram showing an example of the arrangement of an apparatus which detects a head area of a person according to the first embodiment.

FIG. 1 is a block diagram showing an example of the arrangement of an apparatus which detects the head area of a person in the first embodiment. In the first embodiment, a head is detected as an ellipse. In a strict sense, therefore, a head area is an elliptic area of the head. For the sake of simplicity of processing, a head area is sometimes a circumscribed rectangle of the ellipse. In the following description, both a head ellipse and a circumscribed rectangle of the head ellipse will be referred to as head areas with no distinction between the two.

First of all, an image capturing unit 101 captures an image including a person. An image acquisition unit 102 acquires the image captured by the image capturing unit 101 as a frame image. In general, the video interface of a computer acquires a frame image from the image capturing unit 101 via a coaxial cable. A face detection unit 103 analyzes the present frame image of the series of frame images sent from the image acquisition unit 102, and detects a face area. A head detection area setting unit 104 sets a head detection range of a person in the present frame based on the face area obtained by the face detection unit 103 or the head area in the previous frame obtained from a head area detection unit 109.

An edge detection unit 105 detects a edge from the head detection area set by the head detection area setting unit 104, and generates an edge image which is comprised of the detected edge. A noise edge deletion unit 120 includes a skin color area detection unit 106 and an edge deletion unit 108. The skin color area detection unit 106 extracts a skin color distribution by using the face area obtained by the face detection unit 103, and detects a skin color area from the set head detection area. The edge deletion unit 108 expands the skin color area obtained by the skin color area detection unit 106, and deletes edge pixels in the expanded area as a noise edge. The head area detection unit 109 as an ellipse detection unit detects a head ellipse by using the edge image which is output from the edge deletion unit 108 and from which noise edge pixels are deleted.

Assume that the user can externally input an instruction to operate or to not operate the noise edge deletion unit 120. An operation flag setting unit 110 sets an operation flag based on, for example, a manually and externally input instruction. That is, when the head area detection unit 109 is to receive the edge image of the head detection area detected by the edge detection unit 105 and detect a head ellipse, the operation flag is set to "L". Setting the operation flag to "H" will cause the head area detection unit 109 to receive the edge image obtained by deleting edges between a skin color area and a hair color area from the edge image of the head detection area detected by the edge detection unit 105 and to detect a head ellipse.

(Operation Sequence)

Figure 2:
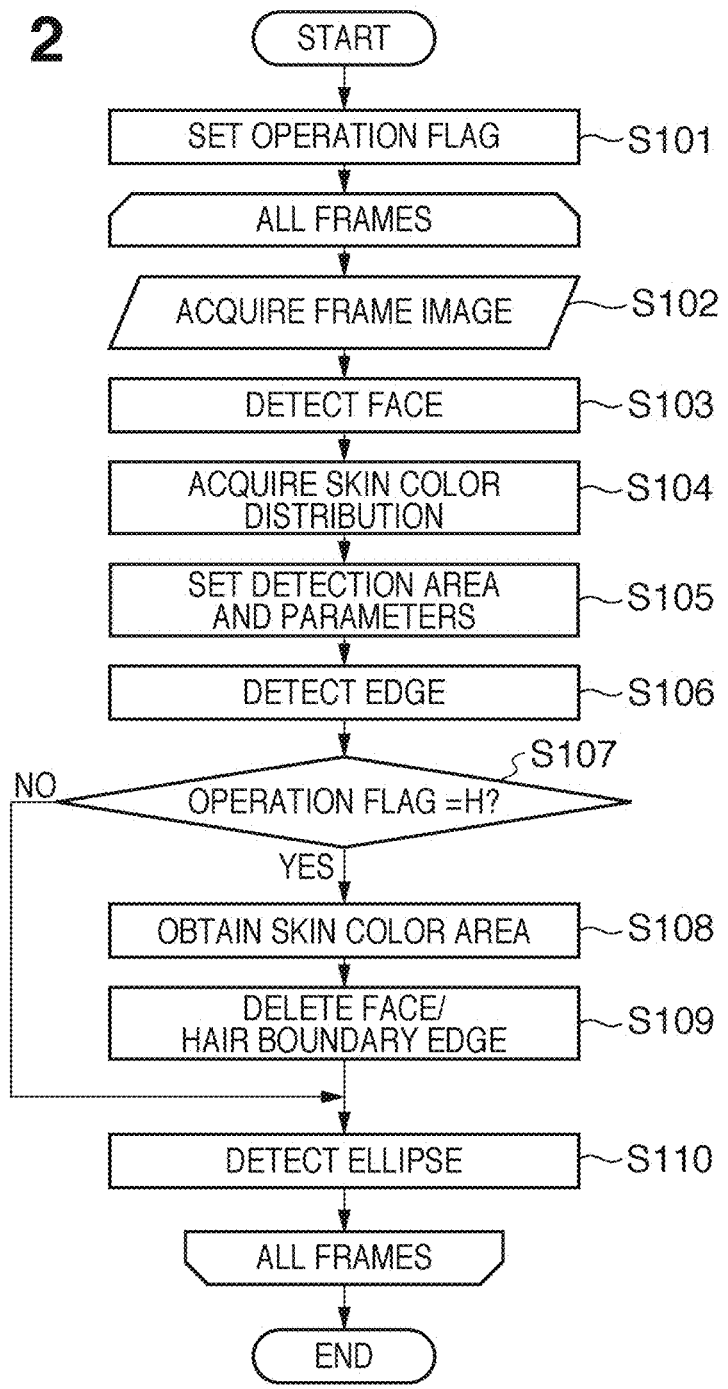
FIG. 2 is a flowchart associated with the detection of a head ellipse in the first embodiment.

FIG. 2 is a flowchart associated with the detection of a head ellipse in the first embodiment. A processing procedure will be described with reference to this flowchart. In step S101, the user configures an output from the operation flag setting unit 110 which controls the noise edge deletion unit 120 to operate or to not operate. The operation flag is set by an external input (not shown). When the operation flag is "H", the noise edge deletion unit 120 fully operates. When the operation flag is "L", the noise edge deletion unit 120 does not operate, and an output from the face detection unit 103 is directly sent to the head area detection unit 109.

That is, when the operation flag is "H", a head ellipse is detected after deletion of inter-skin color area/hair color area edges. When the operation flag is "L", a head ellipse is detected by using the edge image of the head detection area detected by the edge detection unit 105. In step S102, the image acquisition unit 102 acquires the picture input to the image capturing unit 101 as a frame image via a coaxial cable by using the video interface of the computer.

In step S103, the face detection unit 103 detects an entire face area by performing face detection for the frame image acquired in step S102. The face detection unit can more stably detect an object with a small area under various illumination conditions, compared to a unit which detects a head area of a person, because the face detection unit focuses attention on a specific area, that is, a face.

In step S104, the skin color area detection unit 106 converts an RGB image I of the face area detected in step S103 into a YUV image by using equations (1):

$$Y = 0.299R + 0.587G + 0.114B$$

$$U = -0.169R - 0.331G + 0.5B$$

$$V = 0.5R - 0.419G - 0.081B \qquad (1)$$

Figure 3:
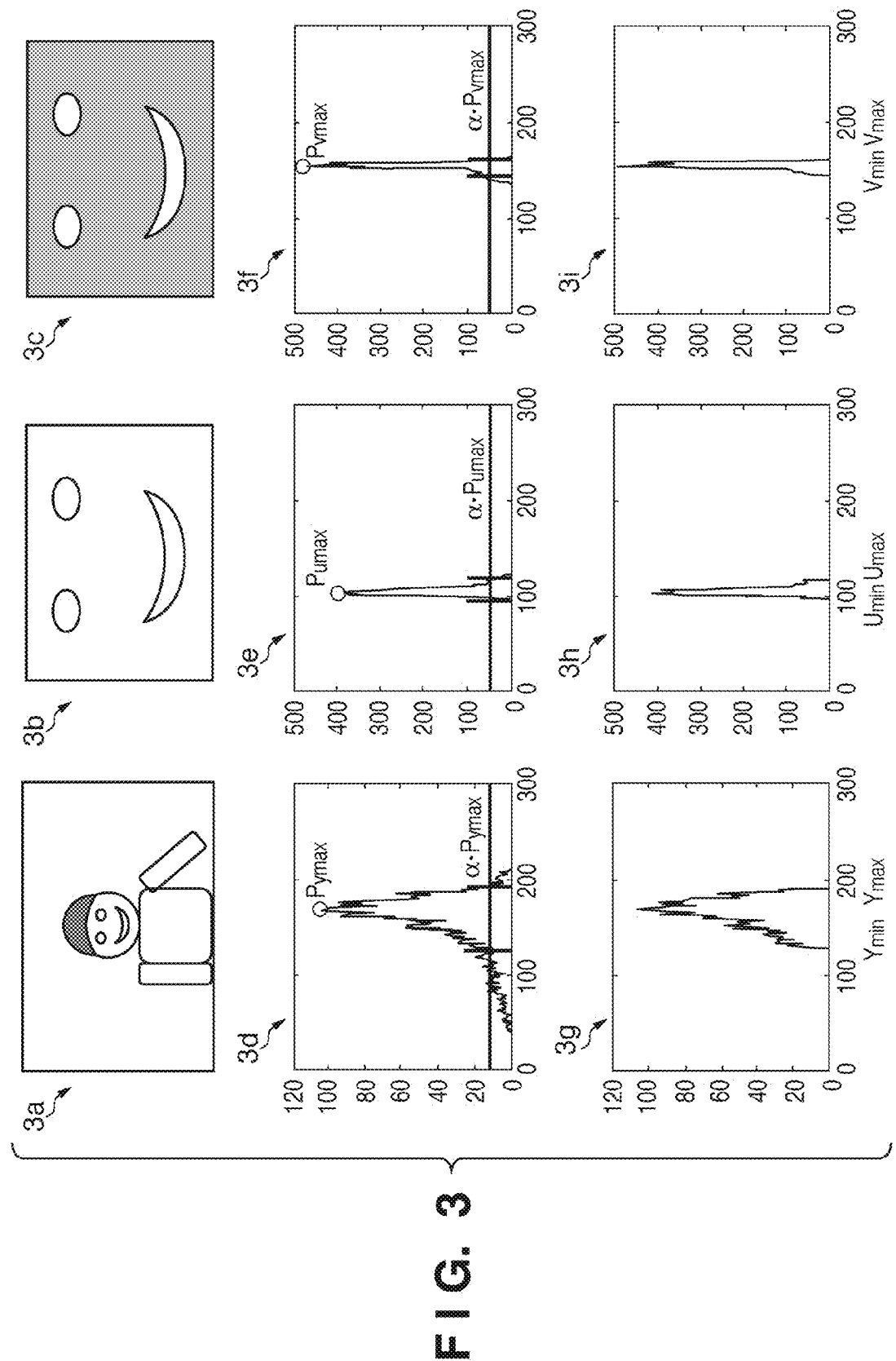
FIG. 3 shows an example of how skin color histograms are acquired in the first embodiment.

FIG. 3 shows an example of how skin color histograms are acquired in the first embodiment.

The face area detected in step S103 includes areas such as the eyes, nostrils, and mouth. It is necessary to generate skin color distributions upon removal of these areas. The first embodiment is configured to obtain skin color distributions for the respective components of Y, U, and V. In FIG. 3, 3a shows a captured frame image of a person. In FIG. 3, 3b shows an RGB image of a detected face portion. In FIG. 3, 3c shows a skin color pixel distribution in the face area.

In FIGS. 3, 3d to 3f respectively show original skin color histograms of Y, U, and V. In FIGS. 3, 3g to 3i respectively show truncated skin color histograms of Y, U, and V. As indicated by 3d to 3f of FIG. 3, small values appear on the left and right sides of the positions of maximum values $P_{Ymax}$, $P_{Umax}$, and $P_{Vmax}$ in the distributions of Y, U, and V in the respective face areas. As indicated by 3g to 3i of FIG. 3, this apparatus obtains positions at which values smaller than $\alpha \cdot P_{Ymax}$, $\alpha \cdot P_{Umax}$, and $\alpha \cdot P_{Vmax}$ in the face area color distributions appear for the first time when moving from the positions of maximum values. The apparatus then sets, as a skin color distribution, each color distribution in the face area within the range between the obtained left and right positions. In this case, the α value is set to, for example, α=0.1.

Figure 4:
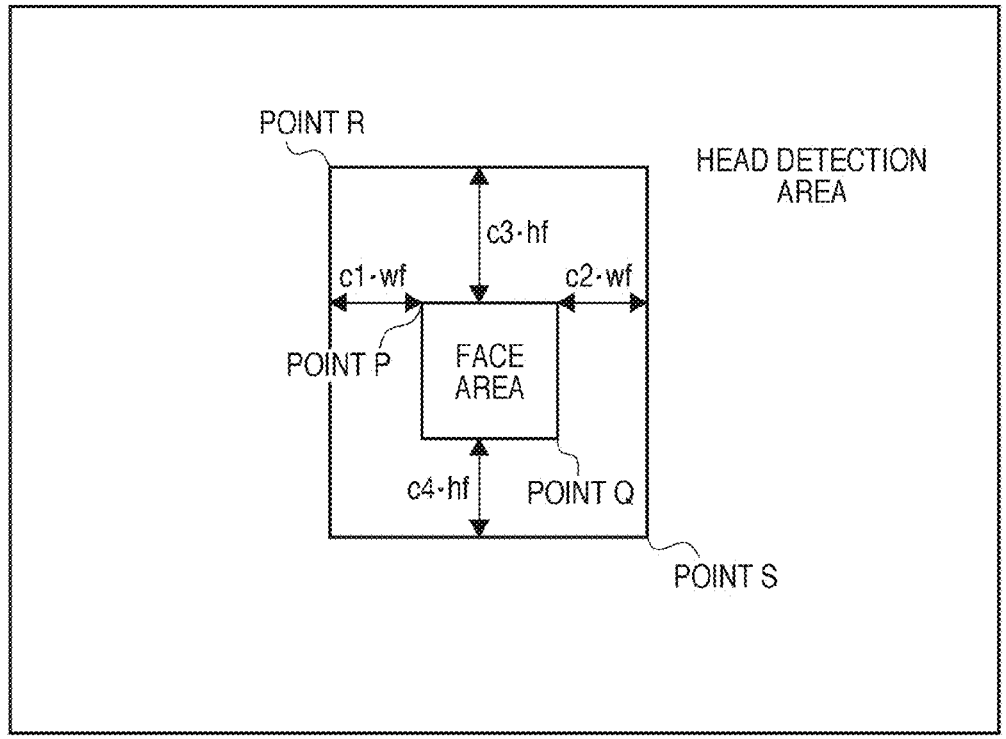
FIG. 4 is a view showing an example of how a head detection area is set by using a face area.

FIG. 4 is a view showing an example of how a head detection area is set based on a face area when no previous frame exists. In step S105, if the face area detected in step S103 is detected for the first time, the head detection area setting unit 104 sets a head detection area based on a width wf and a height hf of the detected face area, as shown in FIG. 4.

Letting (xf1, yf1) be the coordinates of a point P which is the upper left end point of the face area and (xf3, yf3) be the coordinates of a point Q which is the lower right end point, the coordinates of a point R which is the upper left end point of the head detection area are represented by (xf1−c1·wf, yf1−c3·hf), and the coordinates of a point S which is the lower right end point are represented by (xf3+c2·wf, yf1+c4·hf). In this case, c1, c2, c3, and c4 are variables, and, for example, the values of the variables used are given by c1=c2=c3=c4=1.0.

Figure 5:
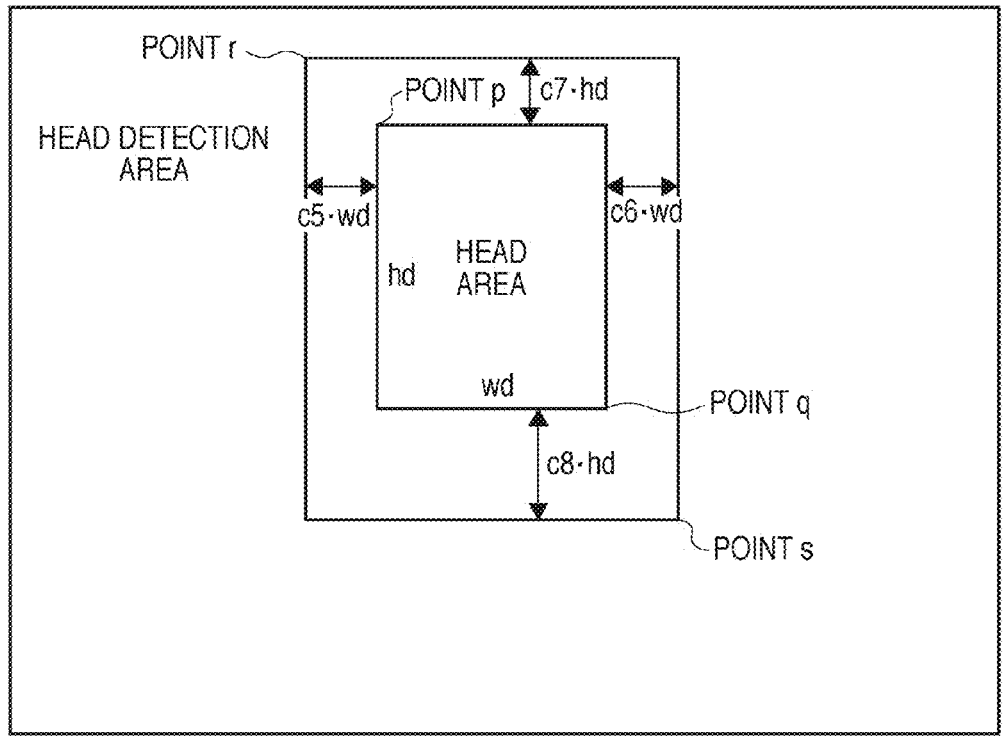
FIG. 5 is a view showing an example of how a head detection area is set by using the head area in a previous frame.

FIG. 5 is a view showing an example of how a head detection area is set when a head area exists in the previous frame. In step S105, if the face area detected in step S103 is not new, the head detection area setting unit 104 sets a head detection area around the head area of the object based on the head area in the previous frame detected in step S110 (to be described later), as shown in FIG. 5. In this embodiment, letting (xd1, yd1) be the coordinates of a point p which is the upper left end point of the head area in the previous frame, (xd3, yd3) be the coordinates of a point q which is the lower right end point of the head area in the previous frame, wd be the width of the head area in the previous frame, and hd be the height of the head area in the previous frame, the coordinates of a point r which is the upper left end point of the head detection area are represented by (xd1−c5·wd, yd1−c7·hd), and the coordinates of a point s which is the lower right end point are represented by (xd3+c6·wd, yd1+c8·hd). In this case, c5, c6, c7, and c8 are variables, and, for example, the values of the variables used are given by c5=c6=c7=c8=0.5.

In addition, the head detection area setting unit 104 sets Hough transformation variables in accordance with the set head detection area. The Hough transformation variables include the minimum and maximum values of central coordinates ($x_0$, $y_0$) and the maximum and minimum values of the ordinate and abscissa (b, a). The head detection area setting unit 104 sets the maximum and minimum values of the ordinate and abscissa (b, a) in accordance with the size of the face area or the size of the head area in the previous frame. The head detection area setting unit 104 sets the minimum and maximum values of the central coordinates ($x_0$, $y_0$) based on the set head detection area, $a_{min}$ which is a minimum value of a, and $b_{min}$ which is a minimum value of b. It is also possible to set the maximum and minimum values of a variable θ of the rotational angle. The head detection area setting unit 104 acquires an RGB image of the set head detection area.

Figure 6:
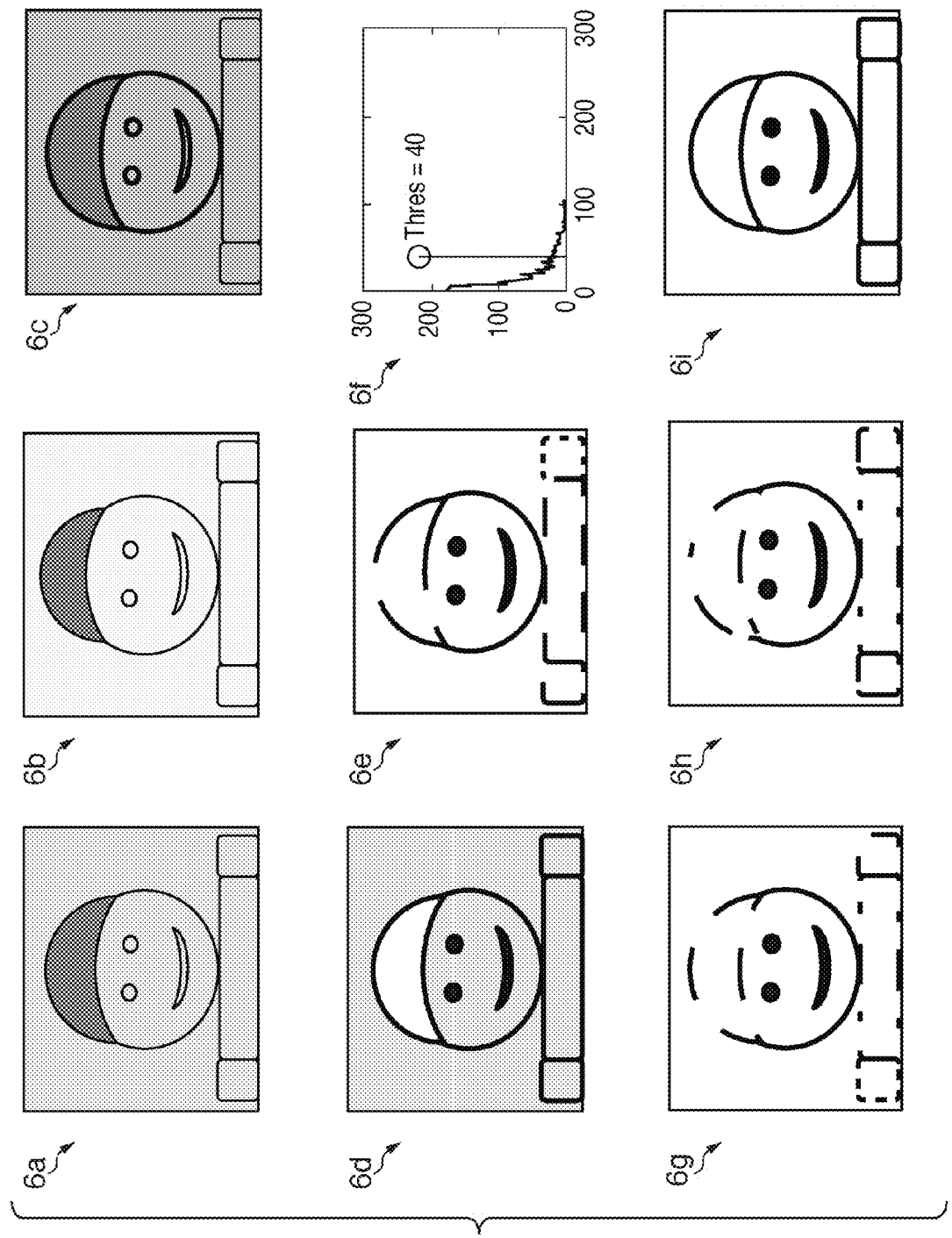
FIG. 6 shows an example of how edge pixels are extracted in a head detection area.

FIG. 6 shows an example of how edge pixels in a head detection area are extracted. In step S106, the edge detection unit 105 detects edge pixels in this area. Various edge detection methods are available. In this embodiment, the edge detection unit 105 binarizes the R (red), G (green), and B (blue) components of an RGB image. The process for R components will be described as an example. In FIG. 6, 6b shows the multilevel expanded image obtained by processing the R component image shown in 6a of FIG. 6. In FIG. 6, 6c shows the multilevel reduced image obtained by processing the R component image shown in 6a of FIG. 6. In FIG. 6, 6d shows the difference image obtained from these obtained expanded image and reduced image. The edge detection unit 105 then generates the luminance distributions of R, G, and B difference images (see 6f of FIG. 6 for the R components), and sets, as a binarization threshold, a difference pixel value of an accumulated luminance distribution which exceeds a predetermined threshold. The edge detection unit 105 generates binary edge images associated with R, G, and B by comparing the values of the R, G, and B difference images with the binarization thresholds. In FIG. 6, 6e, 6g, and 6h show the R, G, and B component binary images, respectively. Finally, as indicated by 6i of FIG. 6, the edge detection unit 105 generates an OR image of the respective component binary images by ORing the R, G, and B component binary edge images. Thus, the edge detection unit 105 extracts edge pixels.

In step S107, the noise edge deletion unit 120 checks whether the operation flag set by the operation flag setting unit 110 is "H" or "L". When the operation flag is "H", the processing in steps S108 and S109 (to be described later) is performed. When the operation flag is "L", the process shifts to the processing in step S110 without performing the processing in steps S108 and S109 (described later).

In FIG. 7, 7a shows the detected head detection area, and 7b shows the relationship between the head detection area and the skin color area. In step S108, the skin color area detection unit 106 extracts pixels included in the skin color distribution range from the head detection area set in step S105 by using the skin color distribution obtained in step S5104, and sets them as a skin color area, as shown in 7b of FIG. 7. The skin color area detection unit 106 determines, according to inequalities (2) given below, whether the extracted pixels are skin color pixels. Pixels which satisfy inequalities (2) are determined to be skin color pixels.

$$\begin{cases} Y_{min} \leq Y(i, j) \leq Y_{max} \\ U_{min} \leq U(i, j) \leq U_{max} \\ V_{min} \leq V(i, j) \leq V_{max} \end{cases} \forall\, i, j \in \text{head detection area} \quad (2)$$

FIG. 8A shows an example of the first expansion mask for a skin color area in the first embodiment. In step S109, the edge deletion unit 108 expands the skin color area obtained in step S108 by using the expansion mask shown in FIG. 8A. In this manner, the edge deletion unit 108 deletes edge pixels in the edge image in the expanded skin color area.

In FIG. 9A, 9a-2 shows the edge image obtained by deleting noise edges from the edge image shown in 9a-1 of FIG. 9A. As shown in FIG. 9A, expanding the skin color area with the expansion mask can delete noise edge portions originating from the eyes, mouth, hairs, and the like in the original edge image by making them enter the expanded area.

If no skin color area exists, the process shifts to step S110 without performing the inter-skin color area/hair color area edge pixel deletion processing.

In this case, since the expansion mask extends in a vertical line, the skin color area expands vertically. The height of the expansion mask is set in accordance with the height of a head detection area. In step S109, the edge deletion unit 108 may normalize the head detection area set in step S105 to a predetermined size. With this normalized size, the edge deletion unit 108 can expand the skin color area with the expansion mask with a fixed size by using the skin color area and edge image, and delete edge pixels in the expanded area. In step S110, when the operation flag is "H", the head area detection unit 109 performs Hough transformation for the edge image obtained in step S109 by using the Hough transformation variables set in step S105. When the operation flag is "L", the head area detection unit 109 generates a candidate head ellipse by performing Hough transformation for the edge image obtained in step S106 by using the Hough transformation variables set in step S105.

In FIG. 9B, 9a shows examples of candidate head ellipses, and 9b shows an example of the head ellipse selected from them. When the operation flag is either "H" or "L", the head area detection unit 109 detects a plurality of candidate head ellipses in step S110, and selects, as a head area, an ellipse determined as optimal, as shown in FIG. 9B. The head area detection unit 109 can implement this determination by, for example, selecting an ellipse whose aspect ratio is closest to the ratio of an ideal head area. Alternatively, the head area detection unit 109 may select an ellipse by evaluating the proportions of skin color areas, the states of edges on elliptic circumferences, or the like. In addition, it is possible to implement comprehensive determination by using a plurality of such evaluation criteria. In this embodiment, in consideration of an increase in execution speed, it is possible to perform the processing in step S109 without using expansion processing. Instead, it is possible to simply delete edge pixels within a predetermined number of rows from the uppermost row of skin color pixels for each column in the skin color area.

In addition, in this embodiment, when obtaining a skin color distribution in step S104, it is possible to obtain the joint distribution of the respective color components as indicated by equation (3) instead of obtaining each color component distribution. It is possible to obtain a joint distribution by degenerating each color component value into a predetermined number of bins.

$$\text{for}(i = 0; i < n; i++) \quad (3)$$
$$\{$$
$$idx = \left\lfloor \frac{y(i)}{4} \right\rfloor + \left\lfloor \frac{u(i)}{4} \cdot 64 \right\rfloor + \left\lfloor \frac{v(i)}{4} \cdot 64 \cdot 64 \right\rfloor;$$
$$hist(idx)++;$$
$$\}$$

where n is the number of skin color pixels, and 4 is the number of degenerated bins.

In addition, it is possible to obtain each color component distribution or a joint distribution by approximating a color distribution using a Gaussian model or the like. Although this embodiment uses a YUV display color system for a skin color distribution, it is possible to use other display color systems, for example, YCbCr, YIQ, HSV, HLS, and XYZ color systems. In addition, it is possible to obtain color distributions with the transformed colors obtained by performing predetermined linear transformation for the colors expressed by R, G, and B without using any standardized display color systems.

Figure 10:
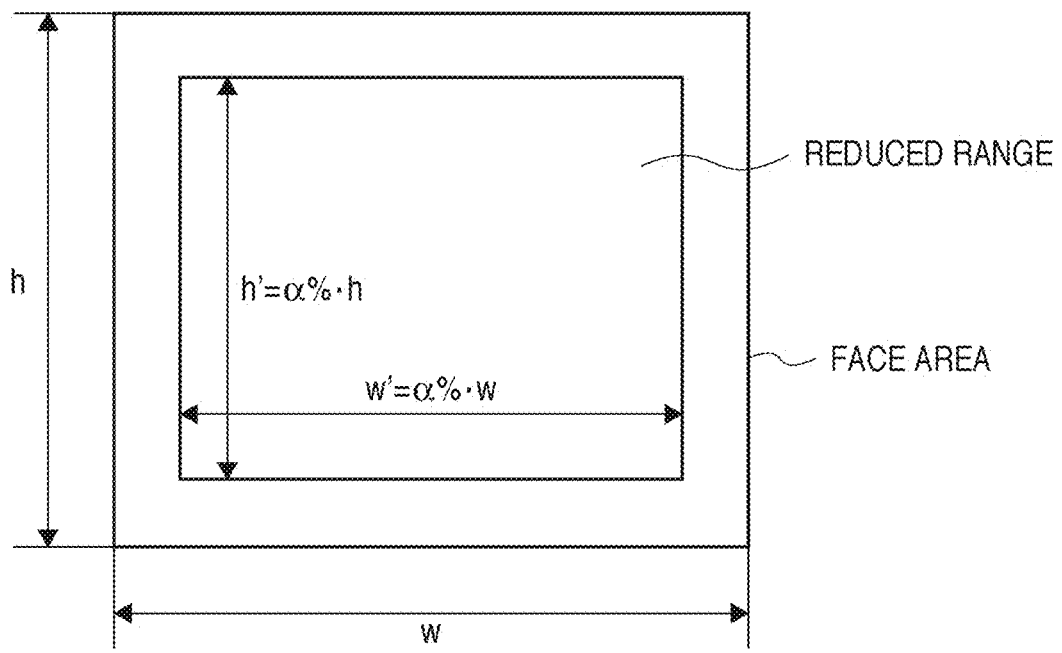
FIG. 10 is a view showing a face area and the range obtained by reducing the face area.

FIG. 10 shows a face area and the range obtained by reducing the face area. In this embodiment, when acquiring a skin color distribution in step S104, it is possible to use pixels in the range obtained by reducing the face area by a predetermined width as shown in FIG. 10 instead of using all the pixels in the face area.

In addition, in this embodiment, this apparatus obtains a skin color distribution from a frame in which a face area could be detected, in the same manner as described above, when acquiring a skin color distribution in step S104. However, the apparatus may store an obtained skin color distribution in advance, and may obtain a skin color area from a frame in which no face area could be detected, by using the stored skin color distribution in step S108.

Figure 11:
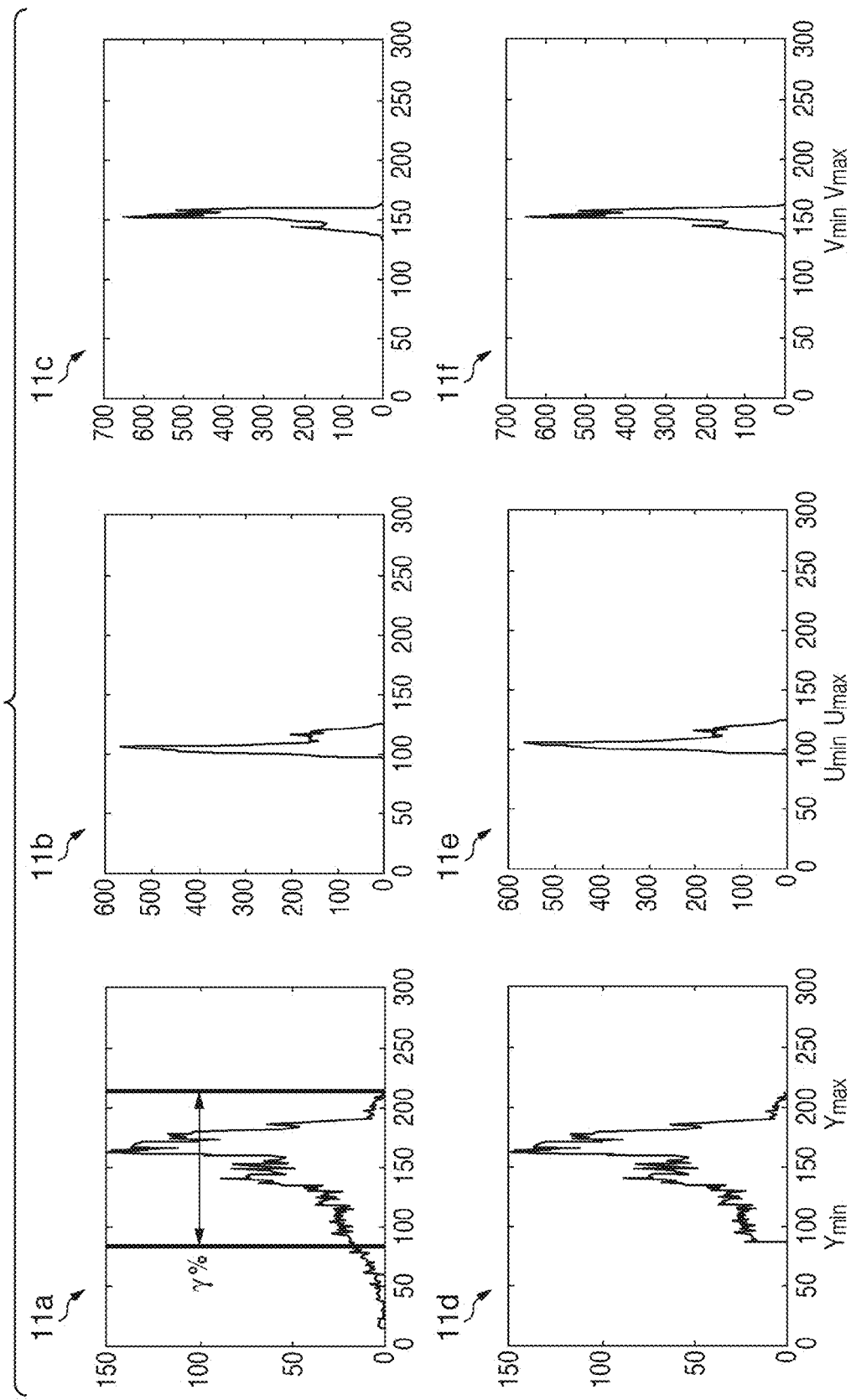
FIG. 11 shows an example of how skin color histograms are acquired.

FIG. 11 shows an example of skin color histogram processing. In FIGS. 11, 11a, 11b, and 11c respectively show Y, U, and V component histograms of a face area. In this embodiment, when acquiring a skin color distribution in step S104, the apparatus obtains positions at which values are smaller than a predetermined threshold, leftward and rightward from the maximum value, in the face area color distribution, in order to remove the pixels in areas such as eye and nostril areas in the face area. In FIGS. 11, 11d, 11e, and 11f respectively show examples of Y, U, and V component histograms, displaying the processing results. The apparatus performs processing so as to limit a skin color distribution within this range. However, as shown in 11a of FIG. 11, it is possible to obtain an accumulated distribution from the right-hand side to the left-hand side of the luminance Y component distribution in the face area and set, as a skin color Y component distribution, a portion of the accumulated distribution which exceeds γ percent as a predetermined value. In addition, the variables presented in this embodiment, for example, the variables of a head detection area range, Hough transformation variables, and the number of degenerated bins of a joint distribution, are examples for the description of the processing in the present invention, and can be changed as needed.

Figure 12:
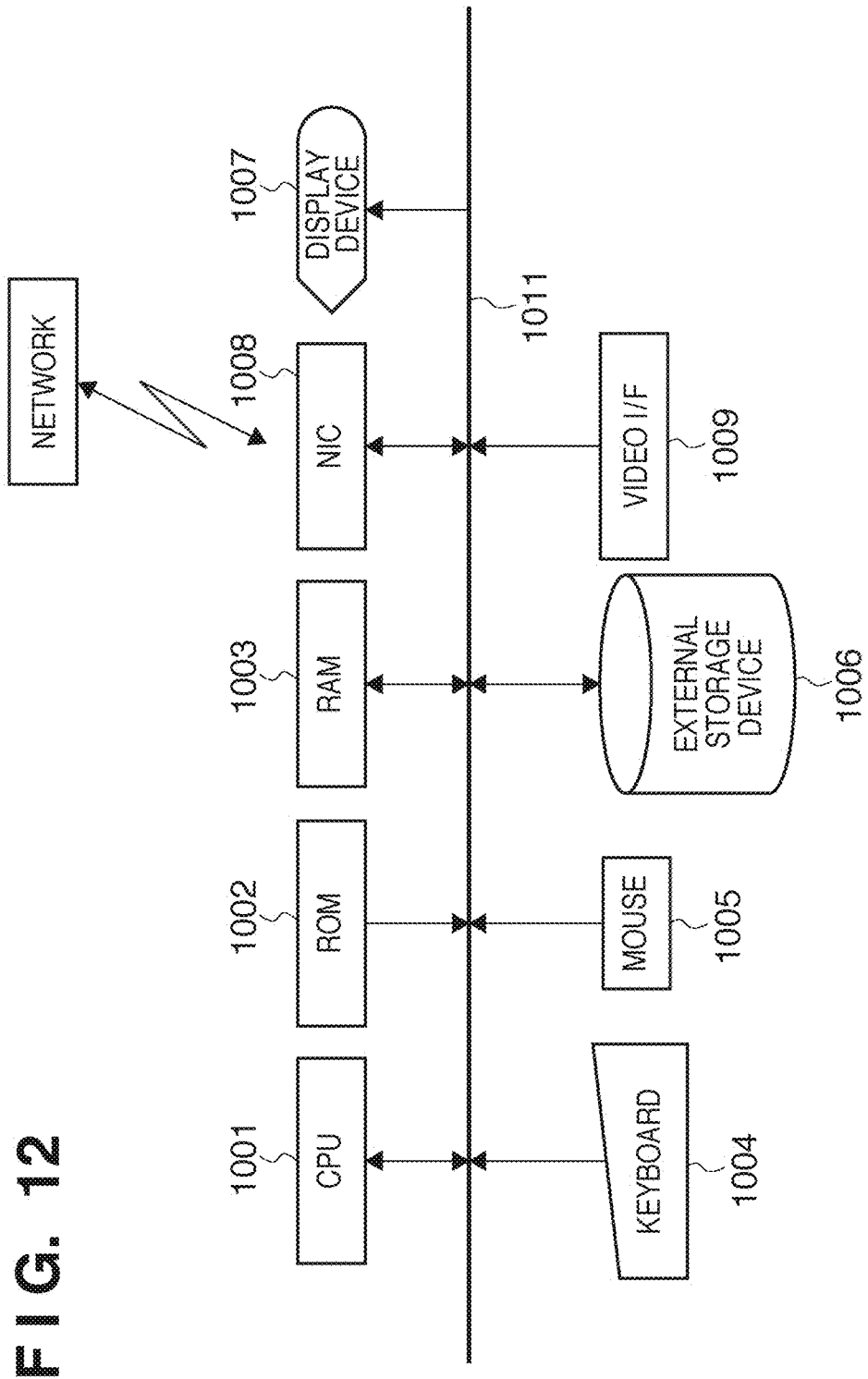
FIG. 12 is a block diagram showing the control arrangement of a computer in the present invention.

FIG. 12 is a block diagram showing an example of the arrangement of a computer capable of implementing the apparatus shown in FIG. 1. Referring to FIG. 12, a CPU 1001 executes various kinds of control in the image processing apparatus of this embodiment. A ROM 1002 stores a boot program to be executed at the startup of the apparatus and various kinds of data. A RAM 1003 stores control programs for the processing performed by the CPU 1001, and provides a work area at the time of execution of various kinds of control by the CPU 1001. A keyboard 1004 and a mouse 1005 provide various kinds of input operation environments for the user.

An external storage device 1006 includes a hard disk, Floppy® disk, optical disk, magnetic disk, magnetooptical disk, and magnetic tape. The external storage device 1006 is not an essential constituent element as long as the control programs and various data are all stored in the ROM 1002. A display device 1007 includes a display, and displays detection results and the like to the user. A network interface 1008 is an interface to communicate with external devices as needed. A video interface 1009 allows the inputting of frame images via a coaxial cable. A bus 1011 electrically connects the above units to allow them to communicate with each other.

Second Embodiment (Arrangement)

Figure 13:
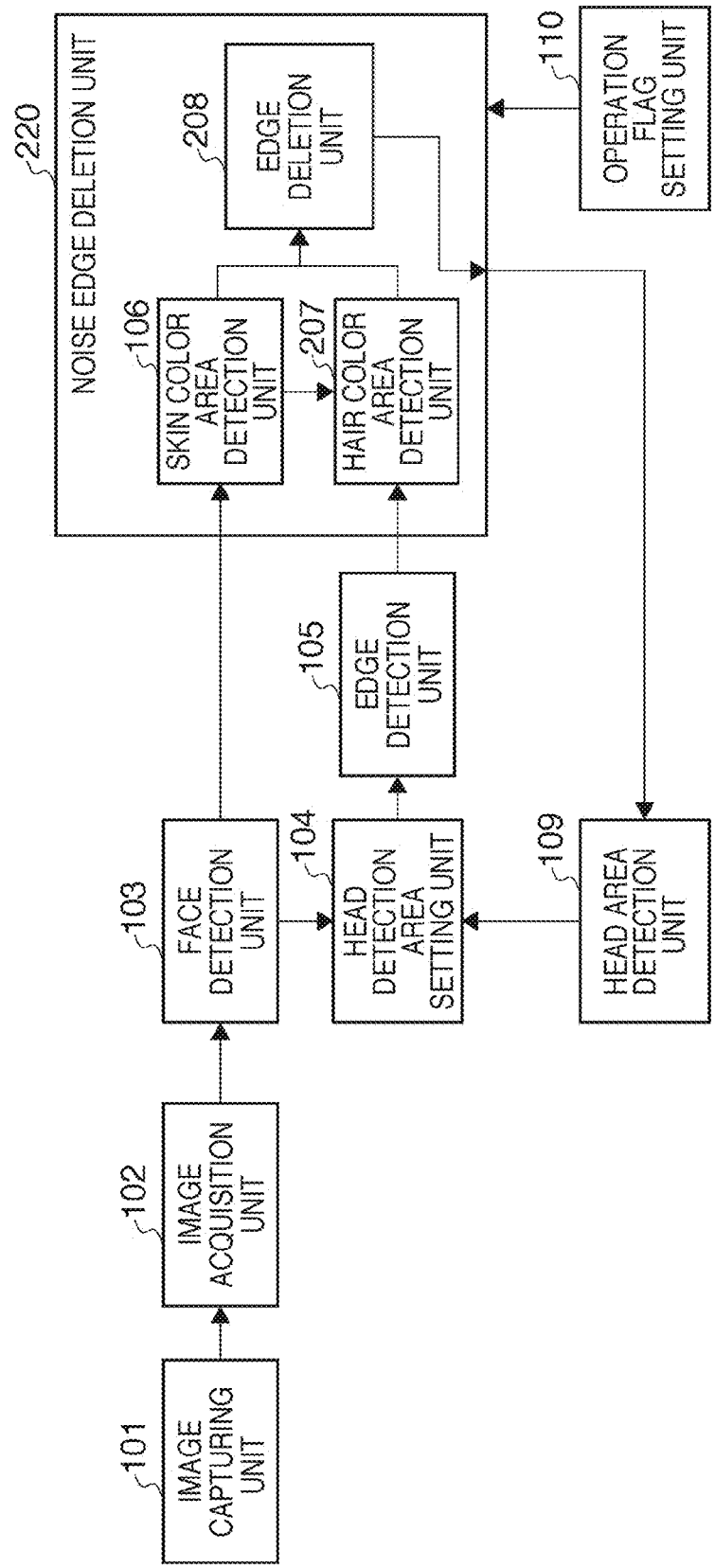
FIG. 13 is a block diagram showing an example of the arrangement of an image processing apparatus according to the second embodiment.

FIG. 13 is a block diagram showing an example of the arrangement of an image processing apparatus according to the second embodiment. The second embodiment differs from the first embodiment in that it additionally includes a hair color area detection unit 207.

As shown in FIG. 13, a noise edge deletion unit 220 includes a skin color area detection unit 106, the hair color area detection unit 207, and an edge deletion unit 208. As in the first embodiment, the skin color area detection unit 106 extracts a skin color distribution by using the face area obtained by a face detection unit 103, and detects a skin color area from the set head detection area.

The hair color area detection unit 207 uses the skin color area obtained by the skin color area detection unit 106 and the edge image obtained by the edge detection unit 105 to obtain hair sample pixels which exist in the area above the skin color area or above a part thereof. The hair color area detection unit 207 then detects a hair color area from the set head detection area by extracting a hair color distribution. An edge deletion unit 208 obtains an area between the skin color area obtained by the skin color area detection unit 106 and the hair color area obtained by the hair color area detection unit 207, and deletes edge pixels in the area, thereby detecting a hair color area.

(Operation Sequence)

Figure 14:
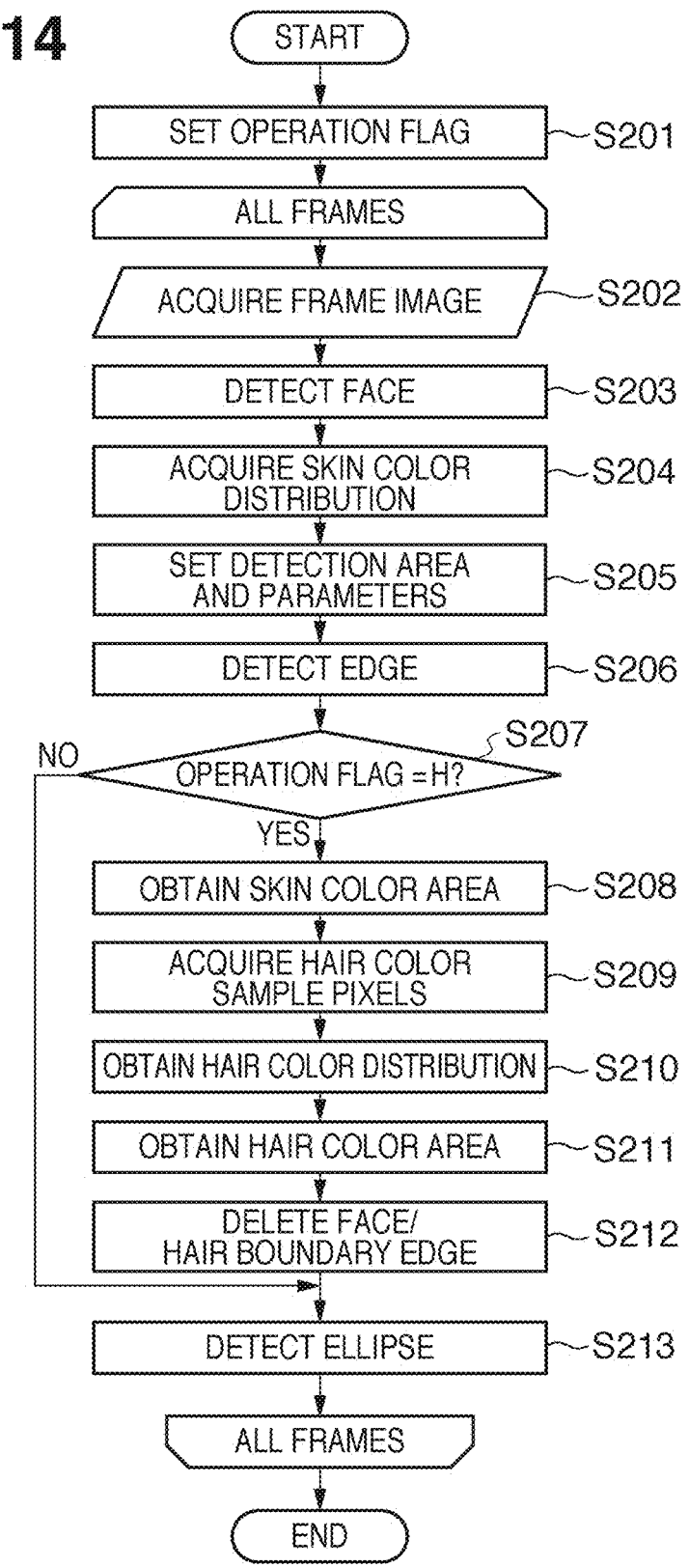
FIG. 14 is a flowchart showing a processing procedure for the detection of a person head area in the second embodiment.

FIG. 14 is a flowchart showing a processing procedure for the detection of a person head area in the second embodiment. The processing procedure will be described with reference to FIG. 14.

The processing from step S201 to step S208 is the same as that from step S101 to step S108 in the first embodiment. The processing from step S209 will be described below.

In step S209, the hair color area detection unit 207 extracts hair color sample pixels in the set head detection area.

Figure 15:
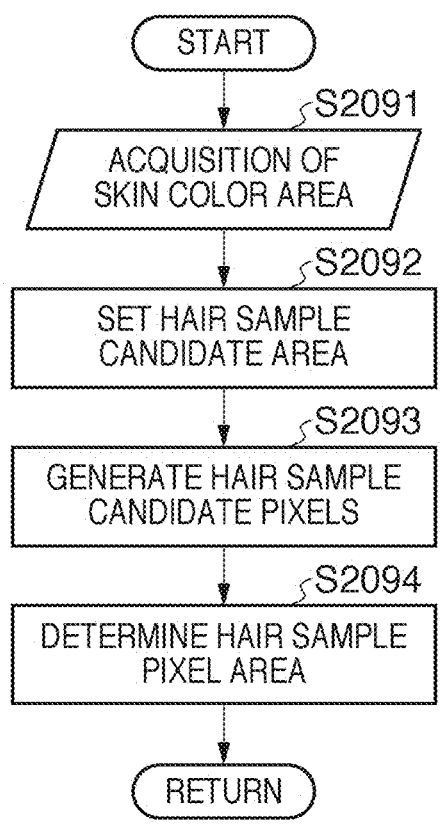
FIG. 15 is a flowchart showing a procedure for the acquisition of a hair color sample in the second embodiment.

FIG. 15 is a flowchart showing a procedure for the acquisition of a hair color sample in the second embodiment. More detailed processing in this step will be described with reference to this flowchart.

In step S2091, the hair color area detection unit 207 acquires the skin color area obtained in step S208.

In FIG. 16, 16a shows an example of a hair sample detection area.

In step S2092, the hair color area detection unit 207 sets, as a hair sample candidate area, an area with a predetermined width which is located at a predetermined position and vertically extends along the central portion of the acquired skin color area, as shown in 16a of FIG. 16.

In step S2093, the hair color area detection unit 207 generates an OR image between a skin color area image and the edge image generated in step S206 in the hair sample candidate area, and generates an image by inverting pixel value 0 and pixel value 1. Finally, for each pixel column, the hair color area detection unit 207 sets pixel values of all the pixels to 0, which are located below the position at which a skin color pixel appears.

In FIG. 16, 16b shows the hair sample candidate pixel image having undergone this processing, and is also a view showing an example of how hair color sample pixels are detected.

In step S2094, the hair color area detection unit 207 searches down each pixel column of the inverted image generated in step S2093 for the position at which the pixel value finally changes from 0 to 1, and sets the pixel values of all the pixels from the upper position to the found position, to 0. The hair color area detection unit 207 sets the remaining pixels as hair sample pixels.

In FIG. 16, 16c shows an example of the extracted hair sample pixels obtained by this processing.

In step S210, the hair color area detection unit 207 obtains Y, U, and V histograms of the obtained hair sample pixels, and obtains minimum pixel values and maximum pixel values $Yh_{min}$, $Yh_{max}$, $Uh_{min}$, $Uh_{max}$, $Vh_{min}$, and $Vh_{max}$ whose frequencies are not 0, thereby setting a hair color range.

Figure 17:
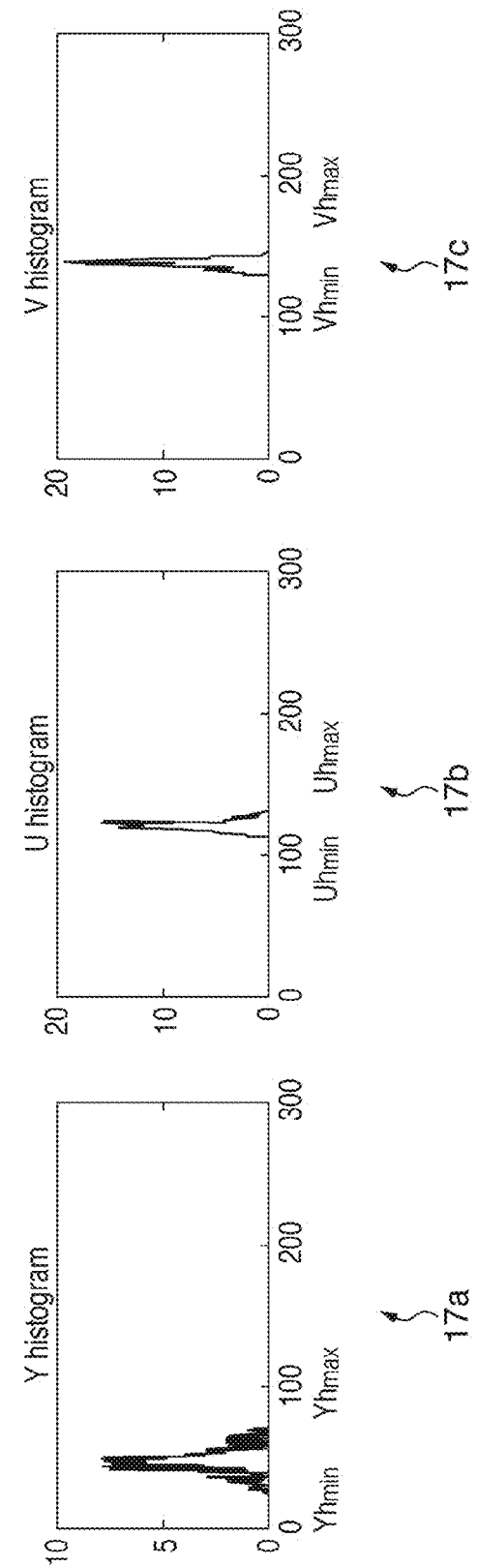
FIG. 17 shows an example of hair sample pixel histograms.

FIG. 17 shows an example of hair sample pixel histograms having undergone this processing. In FIGS. 17, 17a, 17b, and 17c respectively show, from the left, examples of Y, U, and V component hair sample pixel distributions. In step S211, the hair color area detection unit 207 searches the head detection area set in step S205 for pixels satisfying inequalities (4), and sets the found pixels as hair pixels.

Figure 18:
FIG. 18 shows an example of a detected hair color area.

FIG. 18 shows an example of the hair color area detected by this processing. In FIG. 18, 18a shows a head detection area, and 18b shows the hair color area detected from the head detection area. In FIGS. 8B, 8a and 8b show an example of the second expansion mask used in the second embodiment.

$$\begin{cases} Yh_{min} \le Y(i, j) \le Yh_{max} \\ Uh_{min} \le U(i, j) \le Uh_{max} \quad \forall\, i,\, j \in \text{head detection area} \\ Vh_{min} \le V(i, j) \le Vh_{max} \end{cases} \quad (4)$$

In step S212, the edge deletion unit 108 determines whether both the skin color area obtained in step S208 and the hair color area obtained in step S211 exist in the detected head area. If both areas exist, the edge deletion unit 108 expands the skin color area and the hair color area by using an expansion mask I shown in 8a of FIG. 8B or an expansion mask II shown in 8b of FIG. 8B, and obtains an overlapping area. The edge deletion unit 208 then deletes the edge pixels in the overlapping area. At the same time, the edge deletion unit 208 may delete the edge pixels in the skin color area obtained in step S5208. In this case, in contrast to the expansion mask (FIG. 8A) in the first embodiment, which has a shape extending in a vertical line, the expansion mask I is configured to expand an area into a rectangular shape, and the expansion mask II is configured to expand an area into a rectangular shape with four rounded corners.

If only the skin color area exists in the head area, the edge deletion unit 208 may expand the skin color area by using the expansion mask shown in FIG. 8A and delete the edge pixels in the expanded area as in the first embodiment.

If only the hair color area exists in the head area or neither the skin color area nor the hair color area is detected, the process shifts to step S213 without performing noise edge pixel deletion processing.

In step S213, when the operation flag is "H", a head area detection unit 209 performs Hough transformation for the edge image obtained in step S212 by using the Hough transformation variables set in step S205. When the operation flag is "L", the head area detection unit 209 performs Hough transformation for the edge image obtained in step S206 by using the Hough transformation variables set in step S205. The head area detection unit 209 detects a plurality of candidate ellipses by this Hough transformation, selects one of the candidate ellipses by reference with a predetermined criterion, and sets the selected ellipse as a head area.

Figure 19:
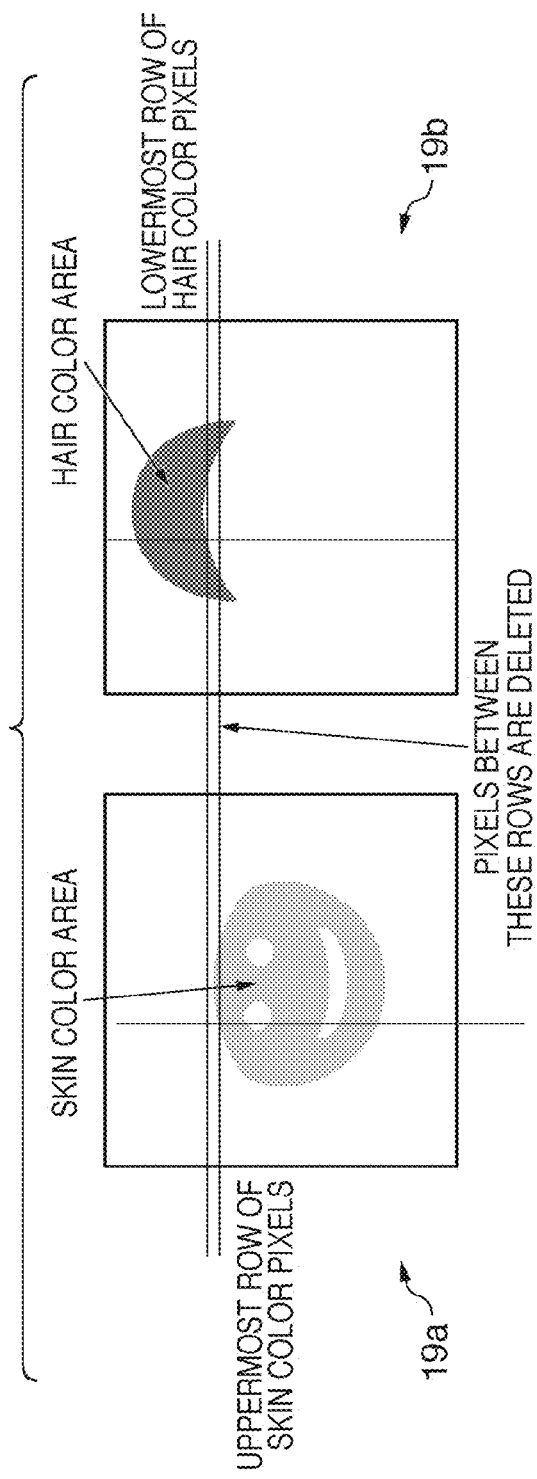
FIG. 19 shows an example of how edge pixels between skin color pixels and hair color pixels are removed.

FIG. 19 shows an example of how edge pixels between skin color pixels and hair color pixels are removed.

This embodiment uses a method of performing the processing in step S212 without using expansion processing, when it is required to increase the execution speed of the processing. That is, as shown in FIG. 19, it is possible to simply delete edge pixels in each column included in the width of the hair sample area, which are located between the lowermost hair color pixel and the uppermost skin color pixel. In this case, to prevent false detection of hair color pixels or skin color pixels, it is possible to delete edge pixels between the lowermost hair color pixel and the uppermost skin color pixel only when the distance between them falls within a predetermined range.

In this embodiment, when obtaining a hair color distribution in step S210, this apparatus can obtain a joint histogram of the respective color components as indicated by inequalities (4), as in the case of a skin color distribution, instead of obtaining each color component histogram. It is possible to obtain a joint histogram by degenerating each color component value into a predetermined number of bins.

In addition, it is possible to obtain each color component distribution or a joint distribution by approximating a color distribution using a Gaussian model or the like. Although this embodiment uses a YUV display color system for a skin color or hair color histogram, it is possible to use other display color systems, for example, YCbCr, YIQ, HSV, HLS, and XYZ color systems. In addition, it is possible to obtain color distributions with the transformed colors obtained by performing predetermined linear transformation for the colors expressed by R, G, and B without using any standardized display color systems.

In addition, this apparatus obtains a hair color histogram from a frame in which a face area could be detected, in the same manner as described above, when obtaining a face color histogram in step S210. However, the apparatus may store an obtained hair color histogram in advance, and may obtain a hair color area from a frame in which no face area could be detected, by using the stored hair color histogram in step S211. In addition, the variables presented in this embodiment, for example, the variables of a head detection area range, Hough transformation variables, and the number of degenerated bins of a joint distribution, are examples for the description of the processing in the present invention, and can be changed as needed.

Third Embodiment (Arrangement)

Figure 20:
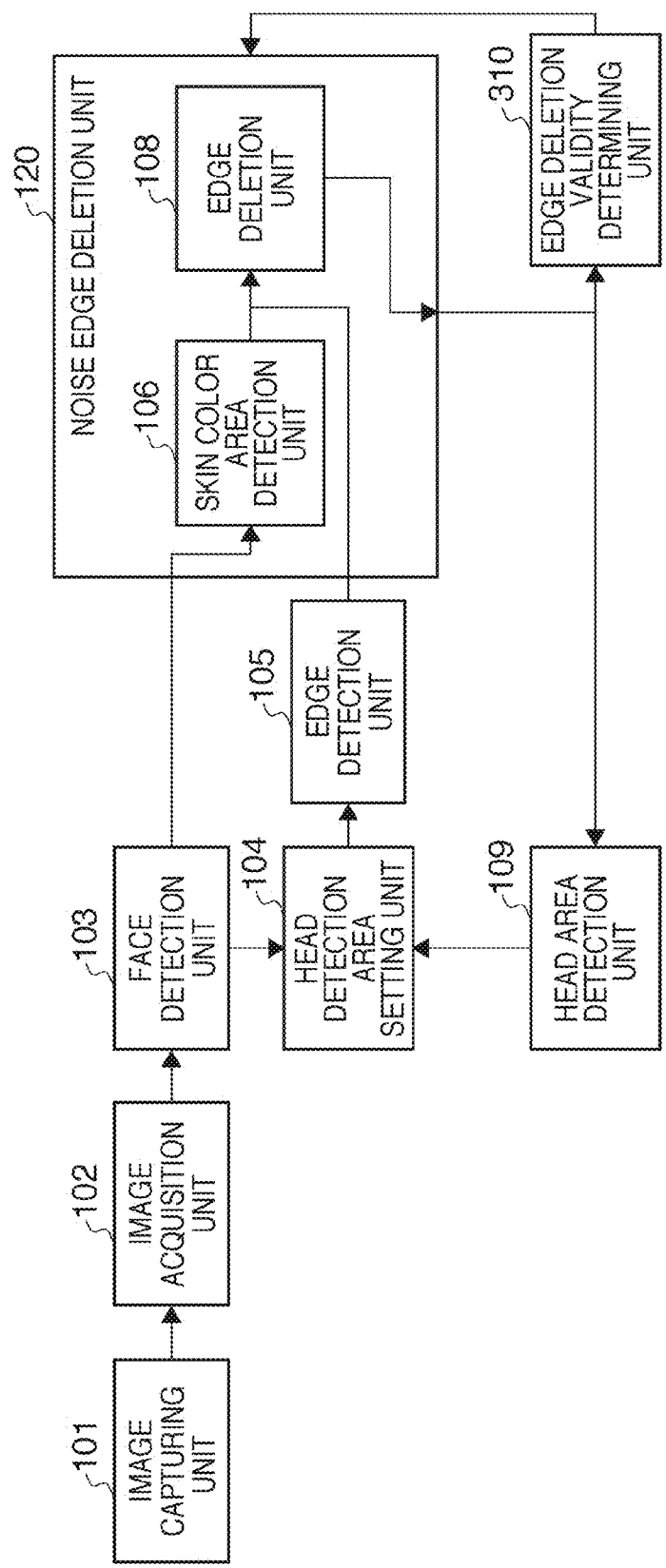
FIG. 20 is a block diagram showing an example of the arrangement of an image processing apparatus according to the third embodiment.

FIG. 20 is a block diagram showing an example of the arrangement of an image processing apparatus according to the third embodiment. The third embodiment differs from the first embodiment in that it includes an edge deletion validity determining unit 310 in place of the operation flag setting unit 110. The third embodiment is the same as the first embodiment except for the edge deletion validity determining unit 310.

In a noise edge deletion unit 120, a skin color area detection unit 106 and an edge deletion unit 108 perform processing. A head area detection unit 109 then performs processing. The operation flag setting unit 110 in the first embodiment sets the operation flag in accordance with an external input. In contrast to this, the edge deletion validity determining unit 310 in the third embodiment determines by itself whether the detected candidate head area is valid, and sets the operation flag based on the determination. As has been described above, when detecting head areas, this apparatus detects various kinds of heads including a bald head, the head of a person facing sideward, and a head with blond hair. It is possible to perform more efficient processing by determining inside the processing apparatus whether a detected head area is valid, instead of performing determination based on an input via an external interface.

(Operation Sequence)

FIG. 21 is a flowchart in the third embodiment. This embodiment will be described in detail below with reference to this flowchart.

In step S301, the edge deletion validity determining unit 310 sets an operation flag "H" as an initial value, and issues a start instruction to the noise edge deletion unit 120. Since the processing from step S302 to step S309 is the same as that from step S102 to step S109 in the first embodiment, the processing from step S310 will be described below.

In step S310, the head area detection unit 109 detects a plurality of candidate elliptic shapes from the edge image obtained in step S306 by performing Hough transformation using the Hough transformation parameters set in step S305. In step S311, the edge deletion validity determining unit 310 determines whether the plurality of candidate head areas detected in step S310 are valid.

Figure 22A:
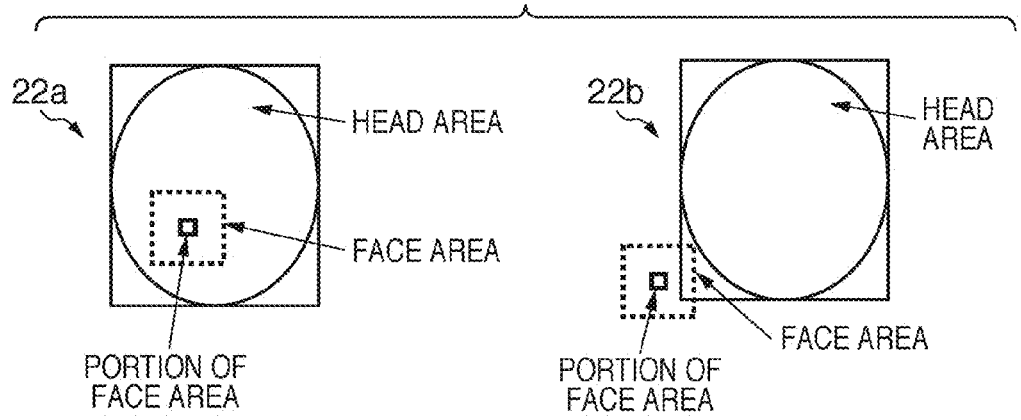
FIGS. 22A, 22B, and 22C are views showing examples of a criterion associated with overlapping between a candidate head area and a face area or its portion, an elliptic arc extending from the leftmost point to the rightmost point of the edge pixels on an elliptic circumference, and a skin color area with respect to a candidate head area.
Figure 22B:
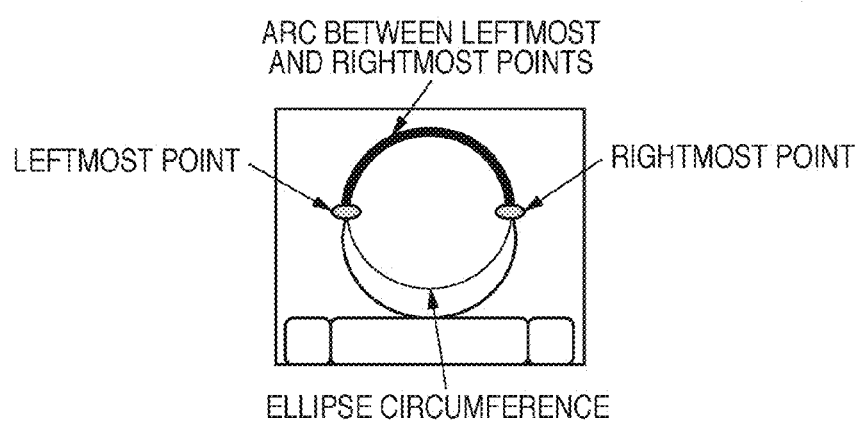
Figure 22C:
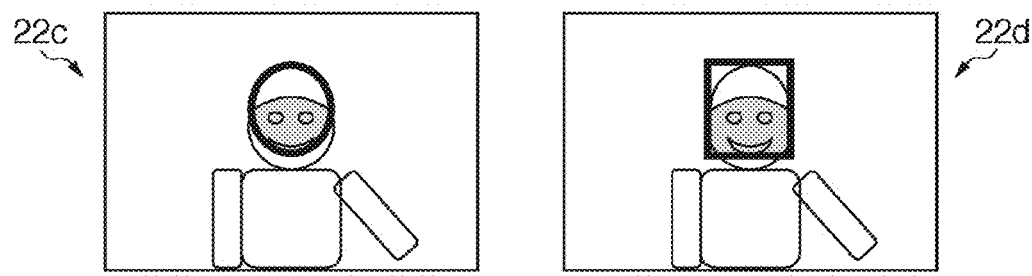

FIGS. 22A to 22C each show an example of a criterion for determining validity. FIG. 22A shows an example of a criterion associated with overlapping between a candidate head area and a face area or its portion. Edge deletion validity determination to determine whether a candidate head area is valid is performed based on predetermined determination criteria described below:

(i) Determination Based on Overlapping between Candidate Head Area and Face Area or Its Portion. FIG. 22A shows an example of a criterion associated with overlapping between a candidate head area and a face area or its portion. As shown by 22a of FIG. 22A, when a candidate ellipse overlaps a face area, the edge deletion validity determining unit 310 determines that this candidate ellipse is valid. However, for example, the apparatus may detect the profile of a person or the like instead of the full face in the first frame. In this case, the apparatus can simultaneously detect a face area and a head area, as shown in (b) of FIG. 22A. However, a candidate head area may not sufficiently overlap the face area then. In this case, the edge deletion validity determining unit 310 determines that the candidate head area is an erroneously detected candidate area, and determines that the candidate ellipse is not valid. Alternatively, the edge deletion validity determining unit 310 may determine validity based on overlapping between the candidate head area and a portion of the face area instead of the entire face area.

(ii) Determination Based on Whether Edge Pixel Count on Elliptic Boundary of Candidate Ellipse Is Equal to or More than Predetermined Threshold. When, for example, an edge pixel count nCnt on the circumference of the candidate head ellipse in FIG. 9B is not equal to or more than a predetermined threshold, the edge deletion validity determining unit 310 determines that the candidate head ellipse is not valid.

(iii) Determination Based on Whether Ratio at Which Edge Pixels on Elliptic Arc Extending from Leftmost Point to Rightmost Point of Edge Pixels Cover Edge Pixels on Elliptic Boundary of Candidate Ellipse Is Equal to or More than Predetermined Threshold. FIG. 22B shows the elliptic arc (the thick black line on the upper portion) extending from the leftmost point to the rightmost point of the edge pixels on the elliptic circumference. As shown in FIG. 22B, the edge deletion validity determining unit 310 counts the edge pixel count nCnt on the elliptic circumference and a pixel count nCur on the elliptic arc extending from the leftmost point to the rightmost point of the edge pixels on the candidate head ellipse. If a ratio $R_1$ represented by equation (5) is smaller than a predetermined threshold, the edge deletion validity determining unit 310 determines that this candidate head ellipse is not valid.

$$R_1 = \frac{nCnt}{nCur} \quad (5)$$

(iv) Determination of Whether Ratio at Which Edge Pixels on Elliptic Boundary of Candidate Ellipse Cover Elliptic Circumference in Head Area Is Equal to or More than Predetermined Threshold. If a ratio $R_2$ between the edge pixel count nCnt on the candidate head ellipse in FIG. 22B and the length of the elliptic arc between the leftmost and rightmost points is smaller than a predetermined threshold, the edge deletion validity determining unit 310 determines that the candidate ellipse is not valid. In this case, since the length of the elliptic arc is approximately proportional to the sum of the ordinate length b and abscissa length a, for example, this criterion can be calculated by equation (6):

$$R_2 = \frac{nCnt}{a+b} \quad (6)$$

(v) Determination of Whether Aspect Ratio of Candidate Ellipse Falls within Predetermined Range. If, for example, a ratio $R_3$ between a length in the ordinate direction b and a length in the abscissa direction a of the candidate ellipse shown in FIG. 22B, which is represented by equation (7), exceeds a predetermined range, that is, $R_2 < th_1$ or $R_2 > th_2$, the edge deletion validity determining unit 310 determines that the candidate head area is not valid.

$$R_3 = \frac{b}{a} \quad (7)$$

(vi) Determination of Whether Ratio of Skin Color Area in Candidate Ellipse Is Equal to or More than Predetermined Threshold. FIG. 22C shows a skin color area with respect to a candidate head area. As shown in FIG. 22C, the apparatus detects skin color pixels in the candidate head ellipse (22c of FIG. 22C) or the circumscribed rectangle of the candidate head ellipse (22d of FIG. 22C) in the same manner as indicated by equation (2). If the ratio between the detected skin color pixel count and the candidate head area is equal to or less than a predetermined threshold, the edge deletion validity determining unit 310 determines that the candidate head area is not valid.

As described above, the edge deletion validity determining unit 310 determines the validity of a candidate head area by determining, by using any of the conditions (i) to (vi), whether a candidate ellipse is valid.

Upon determining in step S311 that one of a plurality of candidate head areas detected in step S310 is valid, the edge deletion validity determining unit 310 maintains the operation flag at "H". The apparatus then causes a noise edge deletion unit 120 to process a subsequent frame image to delete a noise edge between a hair color and a skin color, and detects a head area by performing Hough transformation.

When the edge deletion validity determining unit 310 determines in step S311 that all the candidate head areas detected in step S310 are not valid, the process shifts to step S312. In step S312, the edge deletion validity determining unit 310 checks whether the operation flag is "H" and the frame to be presently processed is the first frame. If the operation flag is "L" or the frame to be processed is not the first frame, the process shifts to the next frame to detect the head area of the object according to the present processing flowchart.

If the operation flag is "H" and the frame to be processed is the first frame, the process shifts to step S313.

In step S313, the edge deletion validity determining unit 310 sets the operation flag to "L". That is, the noise edge deletion unit 120 does not process the present and subsequent frame images. In this state, the edge image obtained from an edge detection unit 105 is directly input to a head area detection unit 109. A head detection area setting unit 104 detects a head area by performing Hough transformation.

With the above operation, in addition the characteristic feature of the first embodiment, the third embodiment has a characteristic feature that the apparatus sets the operation flag to cause the noise edge deletion unit to operate in accordance with the determination by the apparatus regarding whether a plurality of extracted candidate ellipses are valid without using any external interface. This eliminates the necessity to externally set the operation flag for each image capturing operation. It is therefore possible to detect a head area more efficiently.

Fourth Embodiment (Arrangement)

Figure 23:
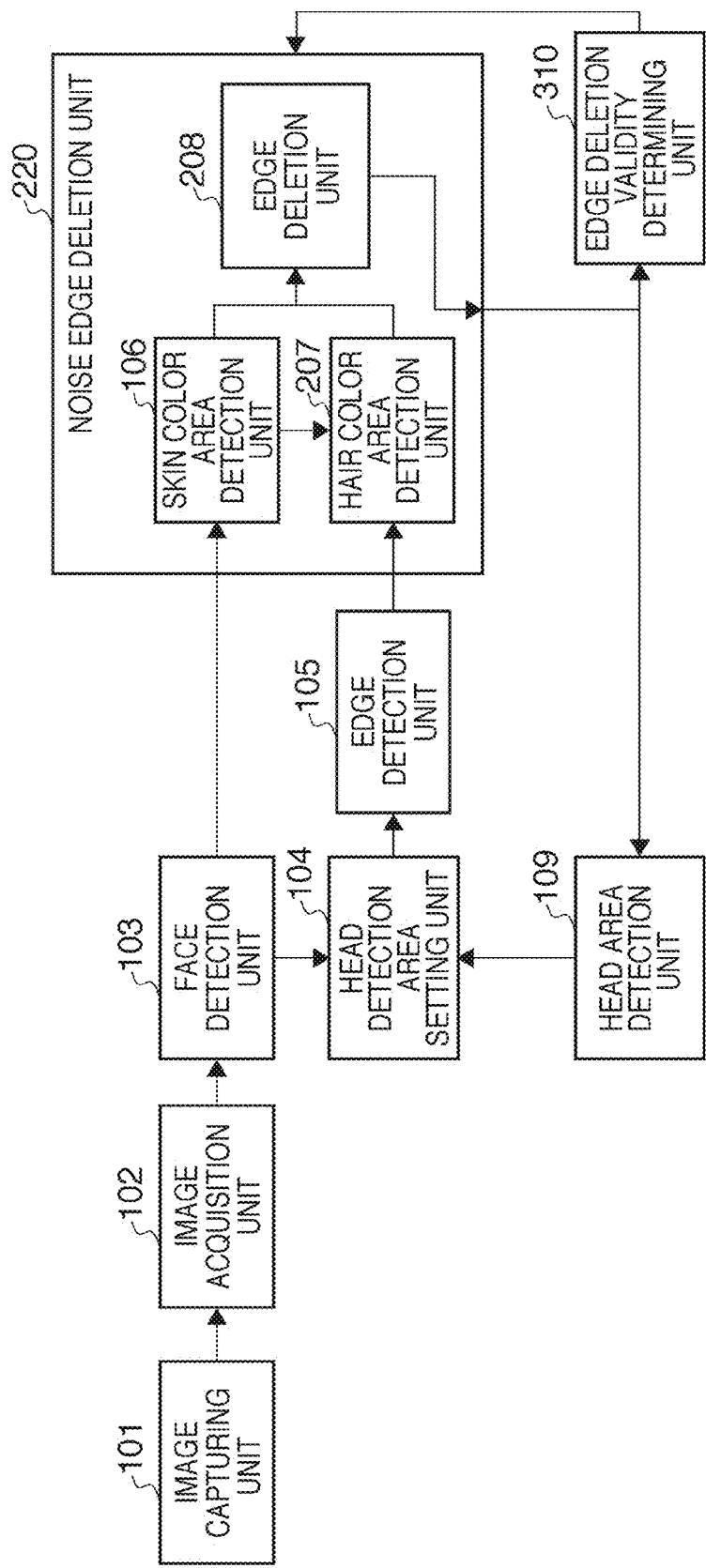
FIG. 23 is a block diagram showing an example of the arrangement of an image processing apparatus according to the fourth embodiment.

FIG. 23 is a block diagram showing an example of the arrangement of an image processing apparatus according to the fourth embodiment. The fourth embodiment differs from the second embodiment in that it includes the edge deletion validity determining unit 310 in place of the operation flag setting unit 110 in the second embodiment.

(Operation Sequence)

Figure 24:
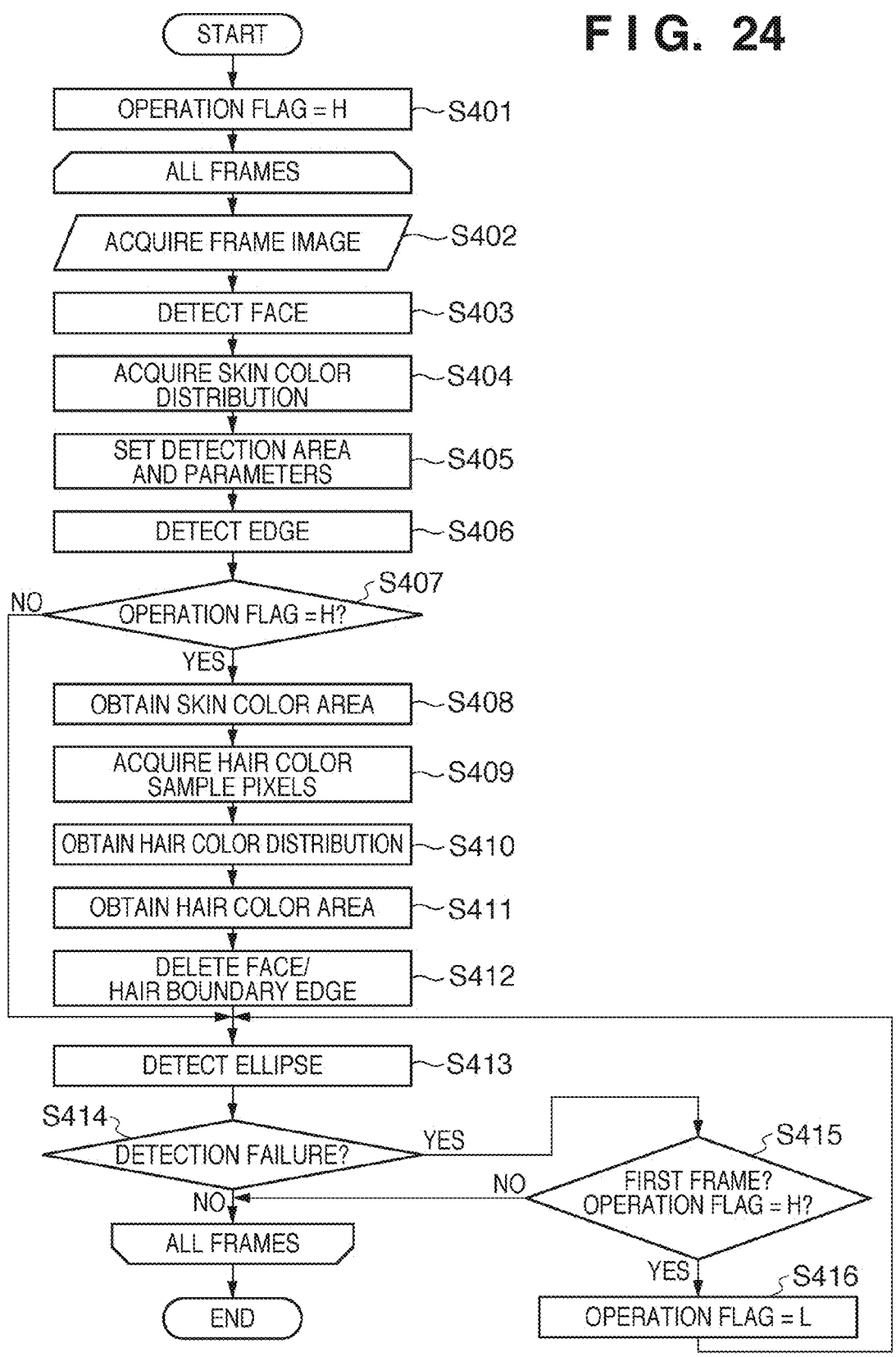
FIG. 24 is a flowchart showing a processing procedure in the fourth embodiment.

FIG. 24 is a flowchart in the fourth embodiment.

In step S401, the edge deletion validity determining unit 310 sets operation flag "H" as an initial value to issue a start instruction to a noise edge deletion unit 220. The operation corresponding to steps S402 to S408 is the same as the processing from step S102 to step S108 in the first embodiment. The operation corresponding to step S409 is the same as the processing in step S209 in the second embodiment. The operation corresponding to steps S413 to S416 is the same as the processing from step S310 to step S313 in the third embodiment.

With the above operation, the fourth embodiment has the characteristic feature of the third embodiment in addition to the characteristic feature of the second embodiment. That is, this apparatus sets the operation flag for causing the noise edge deletion unit to operate by determining by itself whether a plurality of extracted candidate ellipses are valid, without using any external interface. This eliminates the necessity to externally set an operation flag for each operation. It is therefore possible to detect a head area more efficiently.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-000793, filed Jan. 5, 2010 which is hereby incorporated by reference herein in its entirety.

What is claimed is:

1. An image processing apparatus comprising:
   a face detection unit configured to detect a face area of a person from an image;

a head detection area setting unit configured to set a head detection area based on the detected face area of the person;

an edge detection unit configured to detect an edge from the set head detection area, and generate an edge image which is comprised of the detected edge;

an edge deletion unit configured to delete an edge existing between the face and hair from the edge image, wherein the edge deletion unit further comprises a skin color area detection unit configured to detect a skin color area from the head detection area based on a color of the face area, and an expansion unit configured to expand the skin color area and delete an edge existing in the expanded skin color area; and an ellipse detection unit configured to detect a candidate ellipse corresponding to a head area from an edge image from which an edge is deleted by said edge deletion unit.

2. The apparatus according to claim 1, wherein in accordance with a predetermined criterion, said ellipse detection unit selects one candidate ellipse from a plurality of candidate ellipses obtained by performing Hough transformation for the edge image from which the edge is deleted, and sets the selected candidate ellipse as a head area.

3. The apparatus according to claim 1, wherein said skin color detection unit comprises:
   a unit configured to obtain a color distribution of pixels in the face area;
   a unit configured to obtain a skin color distribution by deleting a predetermined portion from the color distribution; and
   a unit configured to detect a skin color area from the head detection area by using the skin color distribution.

4. An image processing apparatus comprising:
   a face detection unit configured to detect a face area of a person from an image;
   a head detection area setting unit configured to set a head detection area based on the detected face area of the person;
   an edge detection unit configured to detect an edge from the set head detection area, and generate an edge image which is comprised of the detected edge;
   an edge deletion unit configured to delete an edge existing between the face and hair from the edge image;
   an ellipse detection unit configured to detect a candidate ellipse corresponding to a head area from an edge image from which an edge is deleted by said edge deletion unit;
   wherein said edge deletion unit further comprises:
   a skin color area detection unit configured to detect a skin color area from the head detection area based on a color of the face area;
   a hair color sample pixel detection unit configured to detect a hair color sample pixel from a hair sample candidate area having a predetermined positional relationship with the skin color area detected by said skin color area detection unit;
   a unit configured to obtain a color distribution of the hair color sample pixels;
   a unit configured to detect a hair color area from the head detection area by using a color distribution range of the hair color sample pixels; and
   a unit configured to delete an edge pixel between the skin color area and the hair color area.

5. The apparatus according to claim 4, wherein said hair color sample pixel detection unit comprises:
   a unit configured to set the hair sample candidate area having a predetermined positional relationship with the skin color area;
   a unit configured to generate a hair sample pixel candidate by removing a skin color pixel from the hair sample candidate area; and
   a unit configured to detect a pixel located above the skin color area from the hair sample pixel candidates and sets the detected pixel as a hair sample pixel.

6. The apparatus according to claim 4, wherein said edge deletion unit further comprises:
   a unit configured to expand the skin color area;
   a unit configured to expand the hair color area; and
   a unit configured to remove an edge pixel in an overlapping area between the expanded skin color area and the expanded hair color area.

7. The apparatus according to claim 4, wherein said unit configured to delete an edge pixel between the skin color area and the hair color area is further configured to delete the edge pixel between a lowermost pixel in the hair color area and an uppermost pixel in the skin color area, in each column in the skin color area, when a distance between the lowermost pixel in the hair color area and the uppermost pixel in the skin color area falls within a predetermined range.

8. The apparatus according to claim 1, further comprising a setting unit configured to manually set whether said edge deletion unit is caused to operate or not.

9. The apparatus according to claim 1, further comprising a validity determining unit configured to determine, based on a determination criterion, whether the candidate ellipse detected by said ellipse detection unit is valid,
   wherein when said validity determining unit determines that the candidate ellipse is valid, said edge deletion unit is operated.

10. The apparatus according to claim 9, wherein said validity determining unit comprises at least one of units including:
    a unit configured to determine whether the candidate ellipse overlaps a face area or a portion of the face area;
    a unit configured to determine whether an edge pixel count on an elliptic boundary of the candidate ellipse is not less than a predetermined threshold;
    a unit configured to determine whether a ratio at which edge pixels on an elliptic arc extending from a leftmost point of the edge pixels to a rightmost point of the edge pixels cover edge pixels on the elliptic boundary of the candidate ellipse is not less than a predetermined threshold;
    a unit configured to determine whether a ratio at which the edge pixels on the elliptic boundary of the candidate ellipse cover an elliptic circumference of the head area is not less than a predetermined threshold;
    a unit configured to determine whether an aspect ratio of the candidate ellipse falls within a predetermined range; and
    a unit configured to determine whether a ratio of a skin color area in the candidate ellipse is not less than a predetermined threshold.

11. An image processing method comprising steps of:
    detecting a face area of a person from an image;
    setting a head detection area based on the detected face area of the person;
    detecting an edge from the set head detection area and generating an edge image which is comprised of the detected edge;
    deleting an edge existing between the face and hair from the edge image, wherein the edge deleting includes detecting a skin color area from the head detection area based on a color of the face area, expanding the skin color area, and deleting an edge existing in the expanded skin color area; and detecting a candidate ellipse corresponding to a head area from an edge image from which an edge is deleted in said deleting step.

12. A non-transitory storage medium storing a computer program for causing a computer system to execute steps defined in claim 11.

13. An image processing method comprising:
a face detection step configured to detect a face area of a person from an image;
a head detection area setting step configured to set a head detection area based on the detected face area of the person;
an edge detection step configured to detect an edge from the set head detection area, and to generate an edge image which is comprised of the detected edge;
an edge deletion step configured to delete an edge existing between the face and hair from the edge image; and
an ellipse detection step configured to detect a candidate ellipse corresponding to a head area from an edge image from which an edge is deleted by said edge deletion step,
wherein said edge deletion step further comprises:
a skin color area detection step configured to detect a skin color area from the head detection area based on a color of the face area;
a hair color sample pixel detection step configured to detect a hair color sample pixel from a hair sample candidate area having a predetermined positional relationship with the skin color area detected by said skin color area detection step;
a step configured to obtain a color distribution of the hair color sample pixels;
a step configured to detect a hair color area from the head detection area by using a color distribution range of the hair color sample pixels; and
a step configured to delete an edge pixel between the skin color area and the hair color area.

14. A non-transitory storage medium storing a computer program for causing a computer system to execute steps defined in claim 13.

\* \* \* \* \*

UNITED STATES PATENT AND TRADEMARK OFFICE
CERTIFICATE OF CORRECTION

PATENT NO. : 8,463,029 B2
APPLICATION NO. : 12/976371
DATED : June 11, 2013
INVENTOR(S) : Muling Guo Page 1 of 1

It is certified that error appears in the above-identified patent and that said Letters Patent is hereby corrected as shown below:

ON THE TITLE PAGE:

Please correct the Assignee name as follows:

At Item (73), Assignee:
"Canon Kbaushiki Kaisha" should read -- Canon Kabushiki Kaisha --.

Signed and Sealed this
Twenty-second Day of October, 2013

Teresa Stanek Rea
*Deputy Director of the United States Patent and Trademark Office*